(12) United States Patent
Mohanarajah et al.

(10) Patent No.: US 12,595,125 B2
(45) Date of Patent: Apr. 7, 2026

(54) AUTOMATED WAREHOUSE SYSTEM AND RETREAT MECHANISM

(71) Applicant: Rapyuta Robotics Co., Ltd., Tokyo (JP)

(72) Inventors: Gajamohan Mohanarajah, Tokyo (JP); Arudchelvan Krishnamoorthy, Tokyo (JP); Kousuke Yunoki, Tokyo (JP)

(73) Assignee: Robotics Co., Ltd., Tokyo (JP)

( * ) Notice: Subject to any disclaimer, the term of this patent is extended or adjusted under 35 U.S.C. 154(b) by 476 days.

(21) Appl. No.: 18/304,407

(22) Filed: Apr. 21, 2023

(65) Prior Publication Data

US 2024/0262621 A1 Aug. 8, 2024

Related U.S. Application Data

(60) Provisional application No. 63/482,805, filed on Feb. 2, 2023.

(51) Int. Cl.
*B65G 1/06* (2006.01)

(52) U.S. Cl.
CPC .................................... *B65G 1/065* (2013.01)

(58) Field of Classification Search
CPC ...................................................... B65G 1/065
See application file for complete search history.

(56) References Cited

U.S. PATENT DOCUMENTS

| | | | | |
|---|---|---|---|---|
| 3,848,755 A | * | 11/1974 | Bussienne ............ | B65G 1/0414 |
| | | | | 414/284 |
| 4,595,329 A | * | 6/1986 | Marques .................. | B65G 1/04 |
| | | | | 414/807 |
| 10,196,208 B1 | * | 2/2019 | Kalm ................... | G06Q 10/087 |

(Continued)

FOREIGN PATENT DOCUMENTS

| | | | | |
|---|---|---|---|---|
| JP | 2019-055871 A | | 4/2019 | |
| JP | 2019119541 A | * | 7/2019 | ........... B65G 1/0492 |

(Continued)

OTHER PUBLICATIONS

JP 2019-119541 A (Sumitomo Heavy Industries) Jul. 22, 2019 (English language machine translation). [online] [retrieved Oct. 8, 2025]. Retrieved from: espacenet. (Year: 2019).*

(Continued)

*Primary Examiner* — Jonathan Snelting
(74) *Attorney, Agent, or Firm* — Trupti P. Joshi

(57) ABSTRACT

An automated warehouse system with a simple configuration allowing for deployment of a shield wall is provided. The automated warehouse system includes a rack including a plurality of floors each including a plurality of floor panels. The floors permit travel of the transportation robot along surfaces of the floors. The plurality of floors are divided into a first section and a second section spaced with a gap in between. A retreat mechanism establishes a first configuration to be located in the gap to permit the transportation robot to travel between the first section and the second section and a second configuration to retreat from the gap to unclose the gap. When the retreat mechanism establishes the second configuration, a shield wall becomes receivable into the gap, the shield wall shielding the first section and the second section from each other.

20 Claims, 18 Drawing Sheets

(56)             References Cited

U.S. PATENT DOCUMENTS

| 10,952,533 | B2 * | 3/2021 | Lert, Jr. | ................. | B65G 1/065 |
| 11,597,597 | B2 * | 3/2023 | Austrheim | ............. | B65G 1/065 |
| 11,628,849 | B2 * | 4/2023 | Austrheim | ............. | B65G 47/52 |
| | | | | | 414/279 |
| 2022/0392273 | A1 | 12/2022 | Austrheim et al. | | |

FOREIGN PATENT DOCUMENTS

| JP | 2022-172392 | A | 11/2022 |
| JP | 2022-553331 | A | 12/2022 |
| WO | WO 2022/207574 | A1 | 10/2022 |

OTHER PUBLICATIONS

International Search Report and Written Opinion mailed on Jul. 4, 2023 in the PCT Application No. PCT/JP2023/016603.

* cited by examiner

30

MANAGEMENT SERVER

33

CONTROLLER

31

STORAGE

PROGRAM

32

SENSOR 34

TRANSPORTATION ROBOT 24

RETREAT MECHANISM 100

SHIELD WALL 35

1

1

AUTOMATED WAREHOUSE SYSTEM AND RETREAT MECHANISM

CROSS-REFERENCE TO RELATED APPLICATIONS

The present application claims priority from U.S. Provisional Application No. 63/482,805, filed on Feb. 2, 2023, the contents of which are hereby incorporated by reference in their entireties.

TECHNICAL FIELD

The present disclosure relates to an automated warehouse system and a retreat mechanism.

BACKGROUND

For example, Japanese Patent Application Publication No. 2015-157683 discloses a storage and retrieval system including a storage rack for storing an article. In the storage and retrieval system, a transportation cart is capable of autonomously traveling along a travel rail located on the storage rack is used to transport an article.

It is desirable that at the time of the occurrence of a fire disaster or the like, a shield wall, such as a fire shutter, for preventing aggravation of the fire disaster be deployed in a storage and retrieval system. However, it is difficult to deploy a shield wall in a storage and retrieval system according to Japanese Patent Application Publication No. 2015-157683 due to the presence of an obstacle such as a travel rail.

The present disclosure has been made in view of the above problem and an object of the present disclosure is to provide an automated warehouse system and a retreat mechanism with a simple configuration allowing for deployment of a shield wall.

SUMMARY

To achieve the above object, an automated warehouse system is provided according to an aspect of the present disclosure, the automated warehouse system including: a rack including a plurality of floors each including a plurality of floor panels adjacent to each other and a plurality of support columns supporting the floors, the floors permitting a transportation robot to travel along surfaces of the floors, the plurality of floors being divided into a first section and a second section spaced from each other with a gap in between; and a retreat mechanism establishing a first configuration to be located in the gap to permit the transportation robot to travel between the first section and the second section and a second configuration to retreat from the gap to unclose the gap, in which when the retreat mechanism establishes the second configuration, a shield wall becomes receivable into the gap, the shield wall shielding the first section and the second section from each other.

In the automated warehouse system, the retreat mechanism includes: a first member located adjacent to the floors in the first section and swingable around a first axis parallel with the surfaces of the floors; a second member supporting the first member on an upper surface of the second member in the first configuration, the second member being located adjacent to the floors in the second section and swingable around a second axis parallel with the surfaces of the floors.

The retreat mechanism further includes a lock mechanism displacing the second member between a lock position and an unlock position, the second member at the lock position supporting the first member on the upper surface of the second member to establish the first configuration, the second member at the unlock position swinging around the second axis to retreat from the gap to establish the second configuration, in which when the unlock position is established, the first member becomes unsupported by the second member and swings around the first axis to retreat from the gap.

The lock mechanism displaces the second member to the unlock position on the basis of a contact with the shield wall.

The retreat mechanism is located between an adjacent pair of the floor panels opposed to each other with the gap in between.

A plurality of retreat mechanisms including the retreat mechanism synchronously transition from the first configuration to the second configuration.

A length from an inner edge to an outer edge of the first member is smaller than a dimension of the gap.

A length from an inner edge to an outer edge of the second member is smaller than a dimension of the gap.

Warning of occurrence of a disaster triggers the second member to be displaced from the lock position to the unlock position.

The second member is displaced from the lock position to the unlock position after the transportation robot retreats from a surface of the retreat mechanism onto the floors.

The automated warehouse system further includes a closure member located in the gap defined on a first level of the rack.

The rack includes a plurality of support columns supporting the floors, the retreat mechanism is located between a pair of the support columns respectively in the first section and second section.

According to another aspect of the present disclosure, a retreat mechanism incorporated into an automated warehouse system is provided, the automated warehouse system comprising a rack including a plurality of floors each including a plurality of floor panels adjacent to each other, the plurality of floors being divided into a first section and a second section spaced from each other with a gap in between, wherein the retreat mechanism establishes a first configuration to be located in the gap to permit the transportation robot to travel between the first section and the second section and a second configuration to retreat from the gap to unclose the gap, when the retreat mechanism establishes the second configuration, a shield wall becomes receivable into the gap, the shield wall shielding the first section and the second section from each other.

The retreat mechanism includes: a first member located adjacent to the floors in the first section and swingable around a first axis parallel with the surfaces of the floors; and a second member supporting the first member on an upper surface of the second member in the first configuration, the second member being located adjacent to the floors in the second section and swingable around a second axis parallel with the surfaces of the floors.

The retreat mechanism further includes a lock mechanism displacing the second member between a lock position and an unlock position, the second member at the lock position supporting the first member on the upper surface of the second member to establish the first configuration, the second member at the unlock position swinging around the second axis to retreat from the gap to establish the second configuration, wherein when the unlock position is established, the first member becomes unsupported by the second member and swings around the first axis to retreat from the gap.

The lock mechanism displaces the second member to the unlock position on a basis of a contact with the shield wall.

The retreat mechanism is located between an adjacent pair of the floor panels opposed to each other with the gap in between.

A length from an inner edge to an outer edge of the first member is smaller than a dimension of the gap.

A length from an inner edge to an outer edge of the second member is smaller than a dimension of the gap.

Warning of occurrence of a disaster triggers the second member to be displaced from the lock position to the unlock position.

DESCRIPTION OF THE EMBODIMENTS

Figure 1:
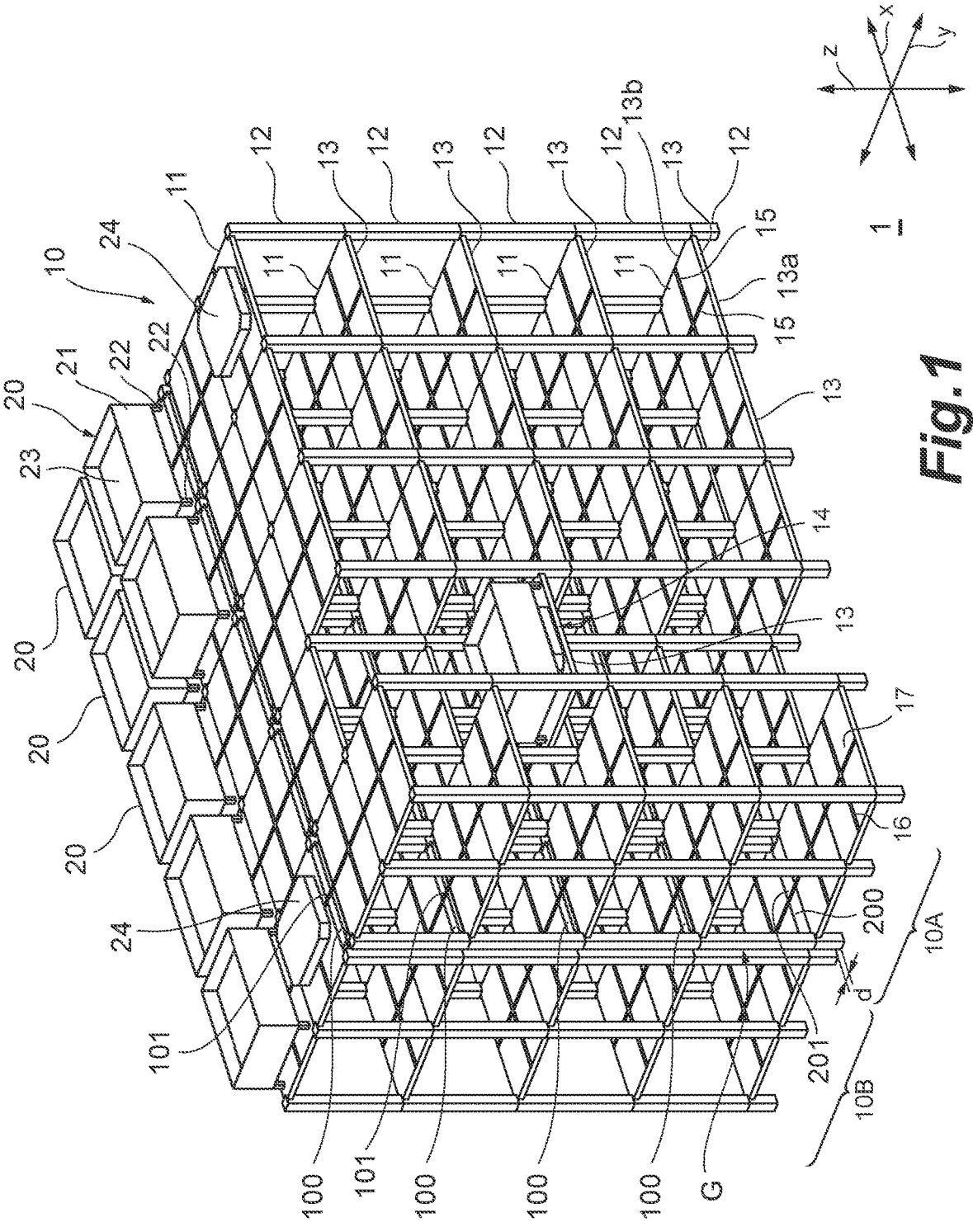
FIG. 1 is a perspective view schematically illustrating an appearance of an automated warehouse system 1 according to an embodiment of the present disclosure.

Description will be made below on an embodiment of the present disclosure with reference to the attached drawings. The same reference numerals are used for referring to the same or similar components throughout all the drawings. The following embodiment is not intended to limit the invention according to any of claims. An example of a disclosed principle and a feature will be described herein but alternations and modifications thereof are possible without departing from the spirit and scope of the embodiment as disclosed. Further, specific features, structures, or characteristics may be combined in any appropriate manner in one or more embodiments. The following detailed description is considered merely as an example and the true scope and spirit should be defined by claims.

FIG. 1 is a perspective view schematically illustrating an automated warehouse system 1 according to an embodiment of the present disclosure. The automated warehouse system 1 is an automated warehouse system capable of automating a series of works from entry of an article including a product or the like into a warehouse to dispatch of the article from the warehouse on the basis of unified management. The automated warehouse system 1 is built on a floor surface within, for example, a building (not illustrated). It should be noted that in the automated warehouse system 1, an x-axis direction and a y-axis direction extending in a horizontal direction and orthogonal to each other and a z-axis direction extending in a vertical direction and orthogonal to the x-axis direction and the y-axis direction are defined. The z-axis direction is a height direction.

The automated warehouse system 1 according to the present embodiment includes a rack 10 located on, for example, the floor surface. The rack 10 includes a plurality of floors 11 and a plurality of support columns 12 supporting each of the plurality of floors 11. The plurality of floors 11 are stacked in the z-axis direction and each of the floors 11 defines a surface along an xy plane. Each of the floors 11 includes a plurality of floor panels 13 adjacent to each other in the x-axis direction and the y-axis direction. Surfaces of the plurality of floor panels 13 are flush with each other. Such a plurality of floor panels 13 cause each of the floors 11 to have a flat surface.

A shape of each of the floor panels 13 is, for example, a quadrangle in a plan view. Each of the floor panels 13 has long sides 13a defined along the x-axis direction and short sides 13b defined along the y-axis direction. The floor panel 13 includes, for example, a flat panel of a resin material. One section of the rack 10 is formed on one floor panel 13. The section is a smallest constituent unit of the rack 10. It should be noted that each of the floor panels 13 may have any other shape, for example, a square, in a plan view.

Each of the floor panels 13 is supported by the support columns 12 at four corners of the floor panel 13. The floor panel 13 is attached to the support columns 12 and removable, for example, from above in the z-axis direction. The support columns 12 are rigid members extending in the z-axis direction. Although formed in, for example, a prismatic shape in the present embodiment, the columns 12 may each have any other shape such as a columnar shape. The support columns 12 include, for example, a resin material. Each of the support columns 12 can support one or more of the floor panels 13. As is apparent from FIG. 1, one support column 12 can support, for example, the corners of one to four floor panels 13.

In the present embodiment, each of the support columns 12 has a length corresponding to a height from one floor 11 to the next. In other words, the floors 11 are each supported by a subset of the plurality of support columns 12. The support columns 12 are configured to be coupled to each other in the z-axis direction. As expressed in another way, a lower end of the support column 12 located above in the z-axis direction can be coupled to an upper end of the support column 12 located thereunder. It should be noted that the length in the z-axis direction of the support columns 12 supporting the floor panel 13 of the floor 11 corresponding to a lowermost level (a first level) is set smaller than that of the support columns 12 supporting the floor panel 13 of the floor 11 corresponding to a second or higher level. The support columns 12 cause the floor 11 corresponding to the first level to be raised from the floor surface to a predetermined height.

The rack 10 includes one or more transportation elevators 14 and the transportation elevator 14 occupies one floor panel 13, or one section. The transportation elevator 14 is movable between the floors 11 in the z-axis direction. The transportation elevator 14 includes one of the floor panels 13, shafts (not illustrated) located at the four corners of the floor panel 13, and an electric motor (not illustrated) attached to a lower surface of the floor panel 13. A drive force of the electric motor causes the floor panel 13 to move upward and downward in the direction of the z-axis along the shafts. It should be noted that the shafts may be replaced by the support columns 12. In addition, the transportation elevator 14 may may be located in, for example, a section inside the rack 10 or the plurality of transportation elevators 14 may be located in the rack 10. In addition, the transportation elevator 14 movable only between a part of the floors 11 may be provided.

Respective two lines 15 are written on the surfaces of all the floor panels 13 constituting the floors 11 and the two lines 15 pass through a center position between the x-axis direction and the y-axis direction in the floor panels 13. In this example, the two lines 15 intersect each other at a right angle. In each of the floors 11, the plurality of floor panels 13 are arranged adjacent to each other in the x-axis direction and the y-axis direction and thus the respective lines 15 of the floor panels 13 define an x-axis line 16 extending in the x-axis direction and a y-axis line 17 extending in the y-axis direction. The x-axis line 16 and the y-axis line 17 each extend from edge to edge across the rack 10. For example, the lines 15 are colored white.

The rack 10 is divided into a first section 10A and a second section 10B spaced from each other with a gap G in between. In the present embodiment, the gap G is formed across the rack 10 along an xz plane. As a result, the two first section 10A and the second section 10B are spaced from each other in the y-axis direction at a distance d as a whole. The distance d is set sufficiently large to allow for receiving a later-described shield wall, or fire shutter, introduced in the automated warehouse system 1. In this example, it is preferable that the distance d be set at, for example, one fourth to one third, approximately, of a length of a short side of each of the floor panels 13. Incidentally, the distance d may be set at any other dimension.

One or more retreat mechanisms 100 are located in the gap G. Each of the retreat mechanisms 100 is located between a pair of the floor panels 13 opposite each other in the y-axis direction. The retreat mechanism 100 is displaceable between a first configuration to close the gap G and a second configuration to unclose the gap G. Details of the retreat mechanisms 100 will be described later. In FIG. 1, the retreat mechanism 100 establishes the first configuration. In the first configuration, the retreat mechanism 100 defines a surface substantially flush with the surfaces of the floor panels 13. The surface of the retreat mechanism 100 is provided with a line 101 and the line 101 constitutes a part of the y-axis line 17 of the pair of floor panels 13 adjacent to the retreat mechanism 100.

In contrast, a closure member 200 is located in the gap G formed for the floor 11 corresponding to the lowermost level (the first level). The closure member 200 closes the gap G. In other words, the closure member 200 is fixed to the gap G and does not unclose the gap G. A surface of the closure member 200 is substantially flush with the surfaces of the floor panels 13. The surface of the closure member 200 is provided with a line 201 and the line 201 constitutes a part of the y-axis line 17 of the pair of floor panels 13 adjacent to the closure member 200. The closure member 200 includes, for example, a flat panel of a resin material as the floor panels 13.

One or more storage bins 20 for storing an article are placed on each of the floors 11 of the rack 10. The storage bin 20 includes, for example, a bin body 21 defining an inner space in a shape of a rectangular parallelepiped and four support legs 22 extending downward from four corners of a bottom surface of the bin body 21. In this example, an upper surface of the bin body 21 is open. An article 23 is housed in the bin body 21. The article 23 is identified by, for example, a unique stock keeping unit (SKU) assigned to the article 23. In addition, the storage bin 20 is identified by a unique ID assigned to each storage bin 20. The unique ID of each storage bin 20 is managed in association with the SKU of the article 23.

One storage bin 20 occupies one floor panel 13, or one section. An outline of the storage bin 20 is defined in, for example, a quadrangular shape in a plan view of the rack 10. The outline of the storage bin 20 is located inside an outline of the floor panel 13. In addition, intervals between adjacent pairs of the support columns 12 are larger than respective lengths in the x-axis direction and in the y-axis direction of the storage bin 20. In addition, a height of the storage bin 20 is set smaller than a height between ones of the floors 11 adjacent to each other in the z-axis direction. A lower space is defined between a bottom surface of the bin body 21 of the storage bin 20 and the surface of the floor 11.

The automated warehouse system 1 includes one or more transportation robots 24 for transporting the storage bin 20. One transportation robot 24 occupies one floor panel 13, or one section. An outline of the transportation robot 24 is located inside the outline of the floor panel 13 in a plan view of the rack 10. The transportation robot 24 is an autonomous transportation robot capable of autonomously traveling within the rack 10 with understanding a self-location on a map. The transportation robot 24 includes, for example, a plurality of mecanum wheels (not illustrated) and is movable in the x-axis direction and the y-axis direction without changing an orientation of the transportation robot 24. In addition, by virtue of a function to trace the x-axis line 16 and the y-axis line 17 of the floors 11 (a line-trace function), the transportation robot 24 is capable of traveling along the x-axis line 16 and the y-axis line 17.

The transportation robot 24 has, for example, a flattened cubic outer shape. In this example, the transportation robot 24 has an outline in a shape of, for example, a square with four corners being cut, or an octagon, in a plan view. In addition, an upper surface of the transportation robot 24 is defined as being flat. A height in the z-axis direction of the upper surface of the transportation robot 24 is defined as being smaller than a height of the bottom surface of the bin body 21 of the storage bin 20. In addition, a side in each of the z-axis direction and the y-axis direction of the transportation robot 24 is set smaller than a distance between an adjacent pair of the support legs 22 of the storage bin 20. In other words, the transportation robot 24 is allowed to enter the lower space below the bin body 21 of the storage bin 20. The transportation robot 24 can thus also travel in the section of the floor panel 13 where the storage bin 20 is placed.

The transportation robot 24 is capable of changing a height of the transportation robot 24 between a first posture where the height of the upper surface of the transportation robot 24 is set at a first height and a second posture where the height of the upper surface of the transportation robot 24 is set at a second height higher than the first height. The transportation robot 24 in the first posture can enter the lower space below the bin body 21. As the height of the transportation robot 24 is changed from the first posture to the second posture in the lower space, the bottom surface of the storage bin 20 is held on the upper surface of the transportation robot 24. As a result, the storage bin 20 is lifted from the surface of the floor 11. The transportation robot 24 can travel on the floor panels 13 either in the first posture or in the second posture. In other words, while lifting the storage bin 20, the transportation robot 24 can travel on the floors 11 and ride on the transportation elevator 14.

The automated warehouse system 1 includes one or more picking stations (not illustrated) for sorting an article stored in the storage bin 20. The picking station is established along, for example, a periphery of the floor 11 corresponding to the second level. In other words, the picking station is defined within the rack 10. It should be noted that the plurality of picking stations may be defined within the rack 10. The transportation robot 24 transports the storage bin 20 placed on the floor 11 of the rack 10 to the picking station. At the picking station, a human operator or a robotic arm performs a sorting work to take out a desired article from the storage bin 20.

Figure 2:
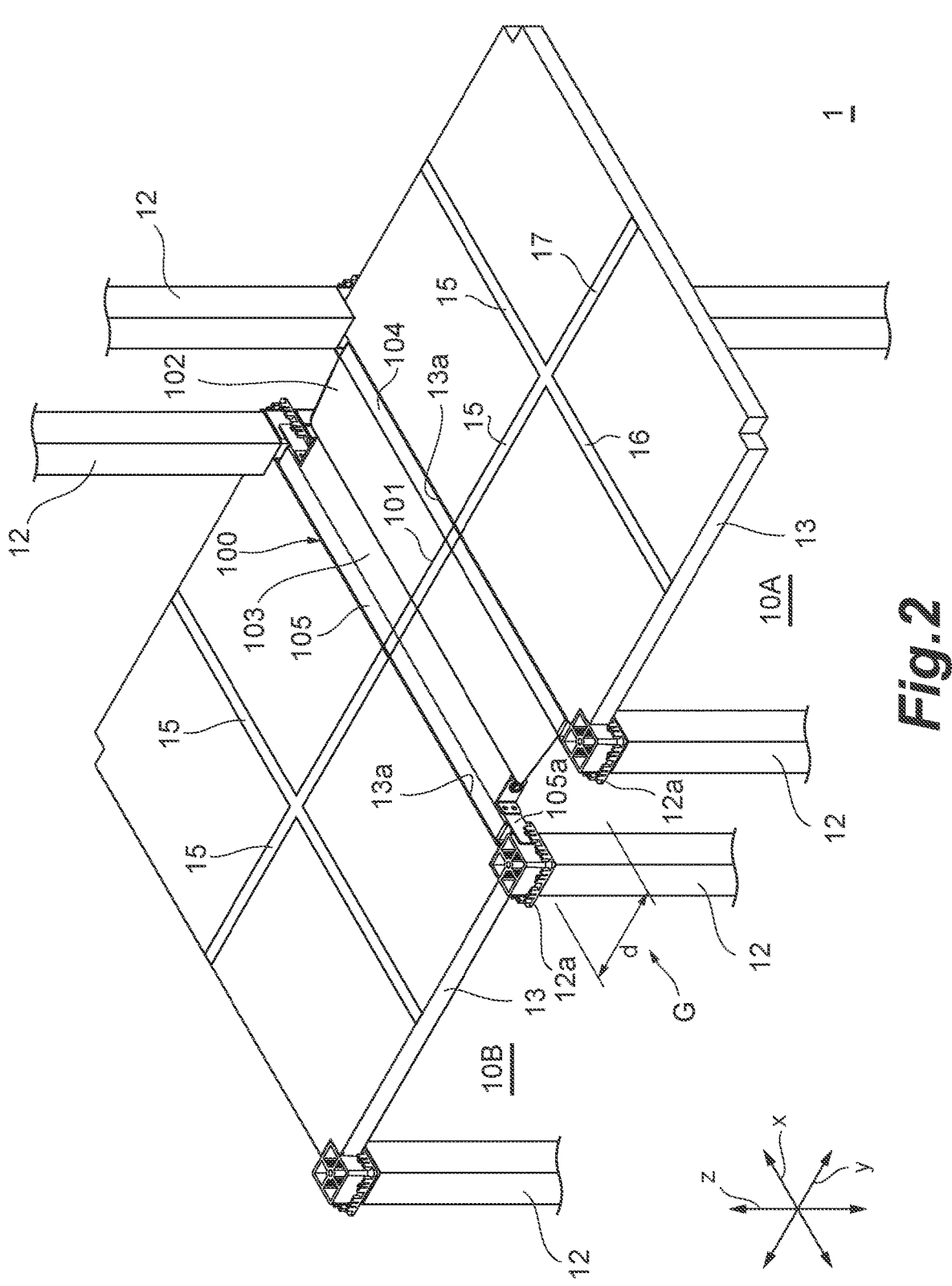
FIG. 2 is an enlarged perspective view schematically illustrating a structure of a retreat mechanism 100 according to a first specific example as viewed from above in a z-axis direction.
Figure 3:
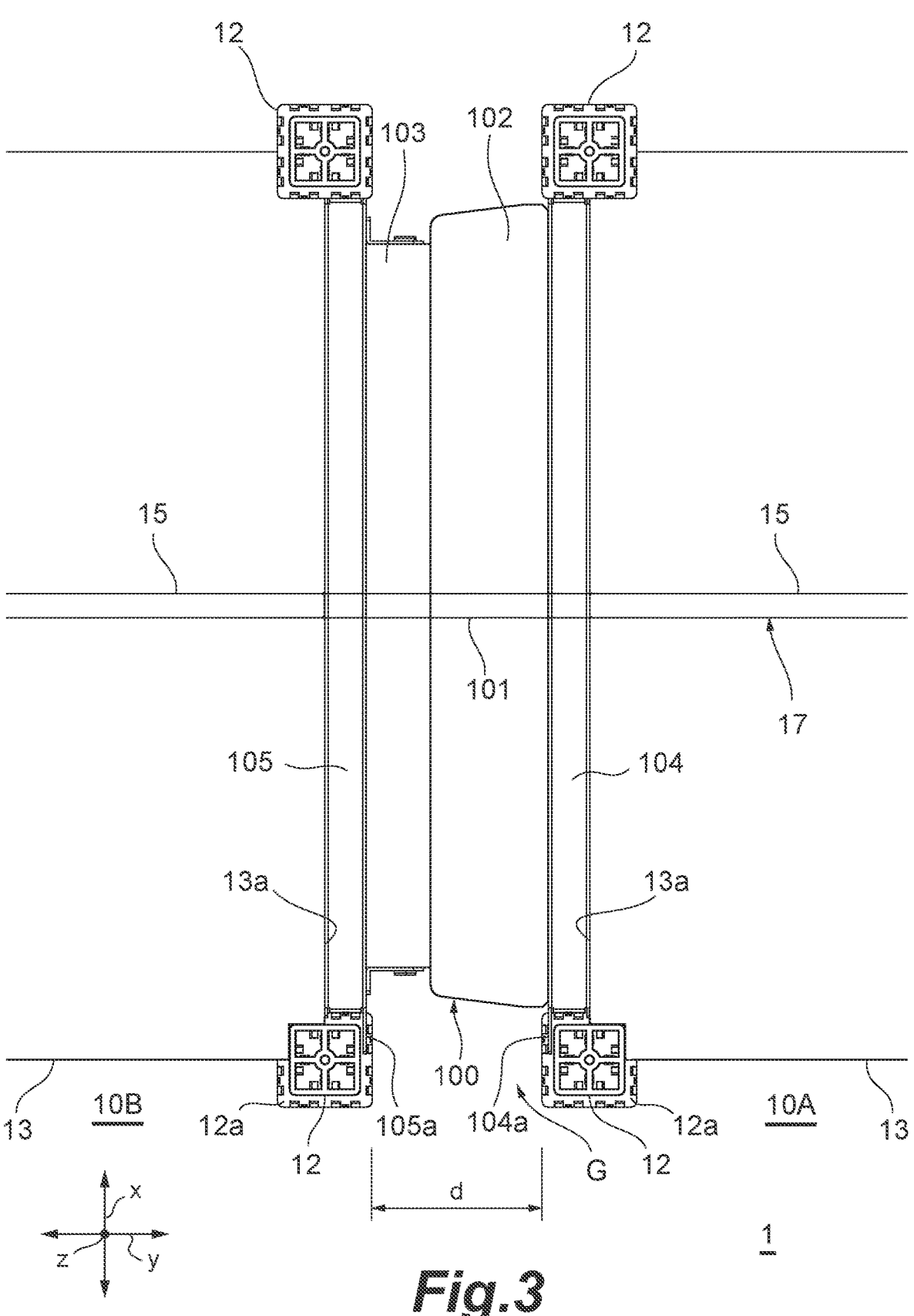
FIG. 3 is an enlarged plan view schematically illustrating the structure of the retreat mechanism 100 according to the first specific example.

FIG. 2 is an enlarged perspective view schematically illustrating a structure of the retreat mechanism 100 according to a first specific example as viewed from above in the z-axis direction. FIG. 3 is an enlarged plan view schematically illustrating the structure of the retreat mechanism 100 according to the first specific example. It should be noted that FIG. 2 and FIG. 3 illustrate only a part of the support columns 12, a pair of the floor panels 13, and the retreat mechanism 100 located between the pair of the floor panels 13 and illustration of the other components is omitted. The retreat mechanism 100 according to the first specific example includes a first plate-shaped member (a first member) 102 located adjacent to a long side 13a of one of the floor panels 13 and a second plate-shaped member (a second member) 103 located along a long side 13a of the other floor panel 13 opposite the long side 13a of the one floor panel 13.

The first plate-shaped member 102 is a plate substantially in a rectangular shape extending from the long side 13a of the one floor panel 13 toward the long side 13a of the other floor panel 13 in a plan view. An inner edge side, or a long side, of the first plate-shaped member 102 is attached to a first attachment member 104. The first attachment member 104 is a member extending in an elongated manner along the long side 13a of the one floor panel 13. The first attachment member 104 has projections 104a projecting in a longitudinal direction from longitudinal opposite ends of the first attachment member 104 and the projections 104a are supported by flanges 12a of the support columns 12 (see a lower side in FIG. 3). In the retreat mechanism 100 establishing the first configuration, the first plate-shaped member 102 defines a surface substantially flush with the surfaces of the floor panels 13.

The second plate-shaped member 103 is a plate substantially in a rectangular shape extending from the long side 13a of the other floor panel 13 toward the long side 13a of the one floor panel 13 in a plan view. An inner edge side, or a long side, of the second plate-shaped member 103 is attached to a second attachment member 105. The second attachment member 105 is a member extending in an elongated manner along the long side 13a of the one floor panel 13. The second attachment member 105 has projections 105a projecting in the longitudinal direction from longitudinal opposite ends of the second attachment member 105 and the projections 105a are supported by the flanges 12a of the support columns 12 (see FIG. 2 and the lower side in FIG. 3). In the retreat mechanism 100 establishing the first configuration, the second plate-shaped member 105 defines a surface substantially flush with the surfaces of the floor panels 13.

Figure 4:
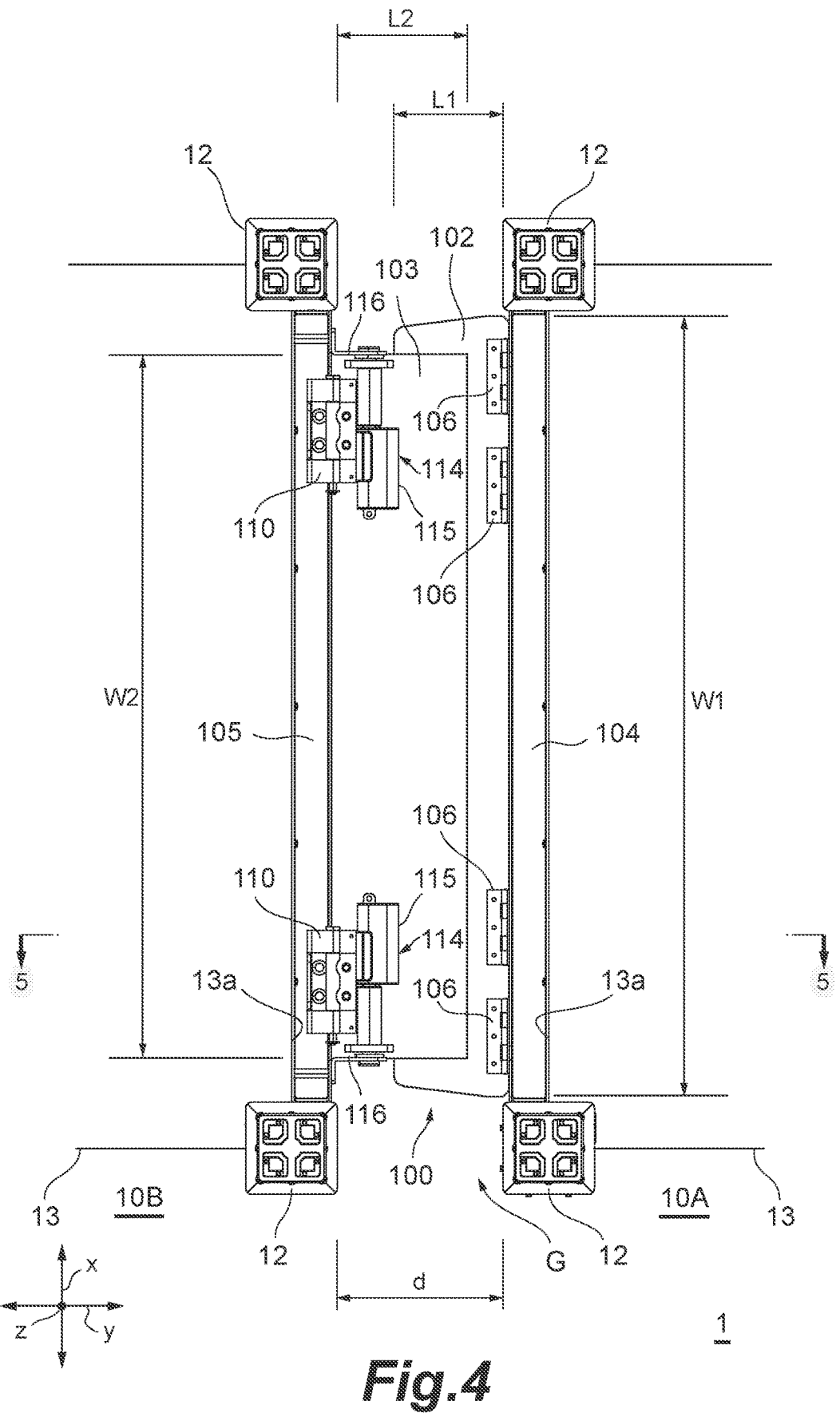
FIG. 4 is an enlarged bottom view schematically illustrating the structure of the retreat mechanism 100 according to the first specific example.

FIG. 4 is an enlarged bottom view schematically illustrating the structure of the retreat mechanism 100 according to the first specific example. Referring to FIG. 2 to FIG. 4 together, a length L1 of the first plate-shaped member 102 defined in the y-axis direction is smaller than a dimension (distance) d of the gap G likewise defined in the y-axis direction. A length L2 of the second plate-shaped member 103 defined in the y-axis direction is smaller than the dimension (the distance) d of the gap G likewise defined in the y-axis direction. An upper surface of the second plate-shaped member 103 thus receives at least a part of a lower surface of the first plate-shaped member 102. In other words, the second plate-shaped member 103 is located with a partial overlap with the first plate-shaped member 102 in a plan view.

In the example illustrated in FIG. 4, a width W1 of the first plate-shaped member 102 defined in the x-axis direction is larger than a width W2 of the second plate-shaped member 103 likewise defined in the x-axis direction. Incidentally, the width W1 and the width W2 may be the same or the width W2 may be larger than the width W1 as long as the width W1 and the width W2 are sufficient for the transportation robot 24 to be able to travel on the surfaces of the first plate-shaped member 102 and the second plate-shaped member 103. It should be noted that as is apparent from FIG. 2 and FIG. 3, the line 101 of the retreat mechanism 100 is formed on and across the first plate-shaped member 102, the second plate-shaped member 103, the first attachment member 104, and the second attachment member 105. The retreat mechanism 100 in the first configuration thus closes the gap G with the first plate-shaped member 102 and the second plate-shaped member 103.

Figure 5:
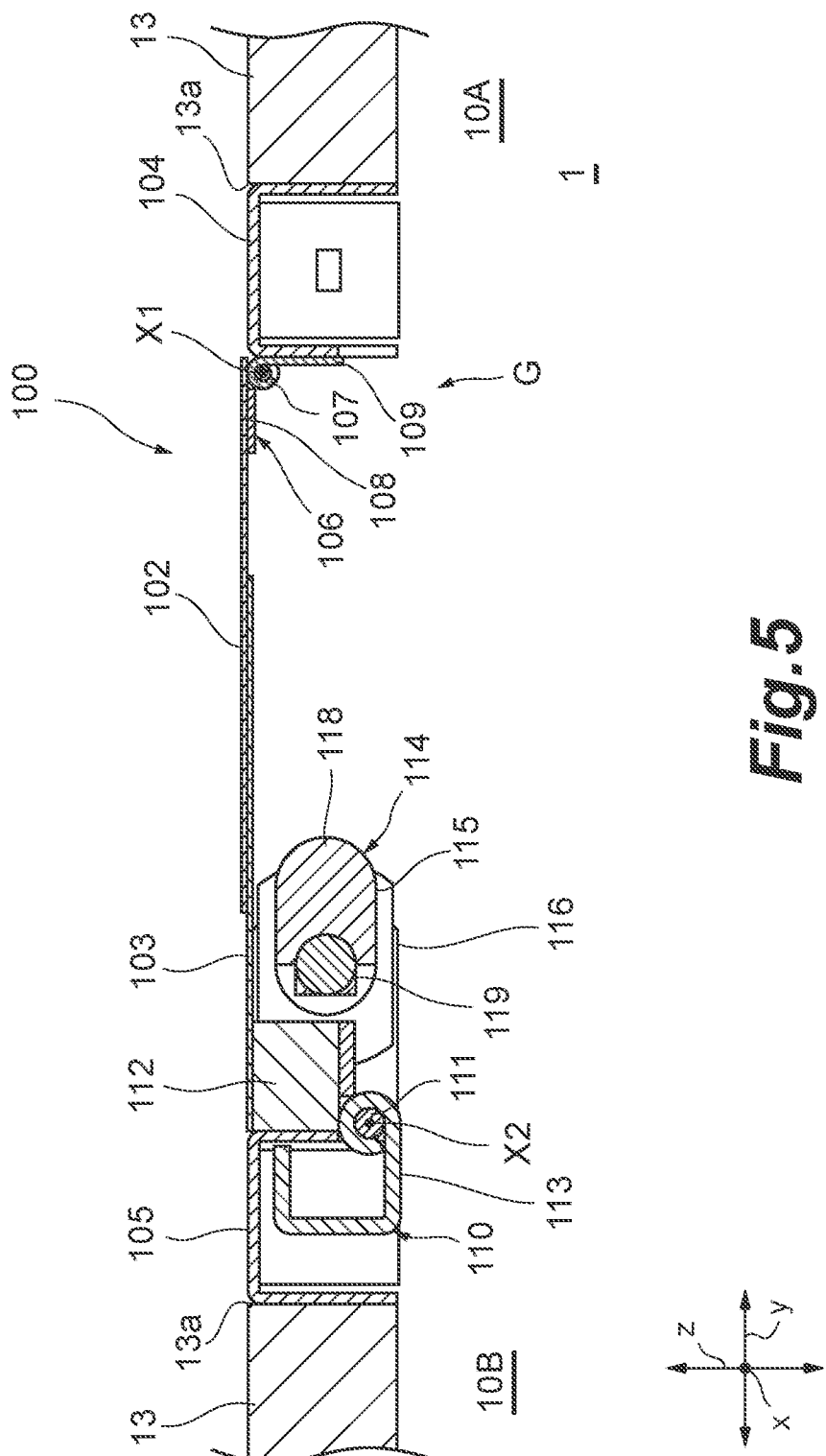
FIG. 5 is an enlarged cross-sectional view taken along a line 5-5 in FIG. 4.
Figure 6:
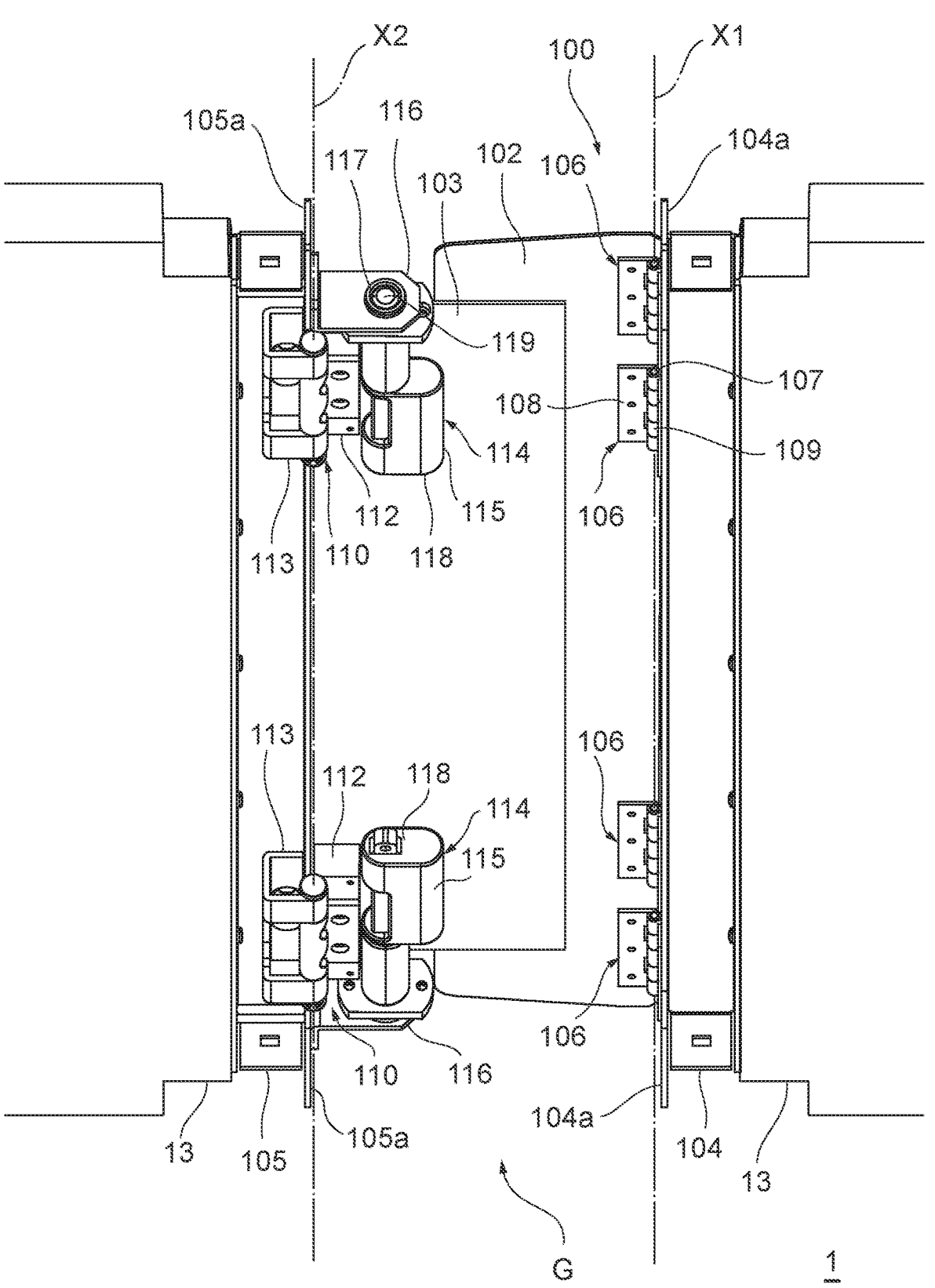
FIG. 6 is an enlarged perspective view schematically illustrating the structure of the retreat mechanism 100 according to the first specific example as viewed from below in the z-axis direction.

FIG. 5 is an enlarged cross-sectional view taken along a line 5-5 in FIG. 4. FIG. 6 is an enlarged perspective view schematically illustrating the structure of the retreat mechanism 100 according to the first specific example as viewed from below in the z-axis direction. It should be noted that FIG. 5 and FIG. 6 illustrate only a pair of the floor panels 13, and the retreat mechanism 100 located between the pair of the floor panels 13 and illustration of the other components is omitted. Referring to FIG. 4 to FIG. 6 together, the first plate-shaped member 102 is swingably attached to the first attachment member 104 with one or more first hinge members 106. In this example, four of the first hinge members 106 are located along a longitudinal direction of the first attachment member 104.

The first hinge members 106 each include a pair of blades 108, 109 and the pair of blades 108, 109 are relatively swingable around a core bar 107 defining a rotation axis X1 parallel with the surfaces of the floor panels 13. In this example, the rotation axis X1 is defined in parallel with the long sides 13a of the floor panels 13. In addition, the rotation axis X1 is defined as being adjacent to an upper surface side of the first attachment member 104 in this example as illustrated in FIG. 5. The blade 108 is attached to the lower surface of the first plate-shaped member 102, whereas the blade 109 is attached to a side surface of the first attachment member 104. The first plate-shaped member 102 is thus configured to be swingable around the rotation axis X1.

In contrast, the second plate-shaped member 103 is swingably attached to the second attachment member 105 with one or more second hinge members 110. In this example, two of the second hinge members 110 are located along a longitudinal direction of the second attachment member 105. The second hinge members 110 each include a pair of brackets 112, 113 and the pair of brackets 112, 113 are relatively swingable around a core bar 111 defining a rotation axis X2 parallel with the surfaces of the floor panels 13. In this example, the rotation axis X2 is defined in parallel with the long sides 13a of the floor panels 13. In addition, the rotation axis X2 is defined as being adjacent to a lower surface side of the second attachment member 105 in this example as illustrated in FIG. 5. The bracket 112 is attached to a lower surface of the second plate-shaped member 103, whereas the bracket 113 is attached to a side surface of the second attachment member 105. The second plate-shaped member 103 is thus configured to be swingable around the rotation axis X2.

The retreat mechanism 100 includes one or more lock mechanisms 114 located on the lower surface of the second plate-shaped member 103. In this example, one lock mechanism 114 is located at each of longitudinal opposite ends of the second plate-shaped member 103. Each of the lock mechanisms 114 includes an actuator 115 attached to the lower surface of the second plate-shaped member 103 and a plate piece 116 attached to the side surface of the second attachment member 105. The plate piece 116 is a plate extending along a yz plane from the side surface of the second attachment member 105. The plate piece 116 is provided with, for example, a circular through hole 117 penetrating the plate piece 116 in the x-axis direction (see FIG. 6).

Meanwhile, the actuator 115 is, for example, an electric linear actuator. The actuator 115 includes an actuator body 118 and, for example, a columnar rod 119 configured to be movable back and forth in the x-axis direction with respect to the actuator body 118. The actuator 115 can convert a rotary motion of an electric motor (not illustrated) located within the actuator body 118 to a linear motion of the rod 119. In this example, the rod 119 linearly moves in the x-axis direction. The rod 119 is thus displaced between a first position for the rod 119 to be partly placed within the through hole 117 of the plate piece 116 and a second position for the rod 119 to retreat out of the through hole 117.

When the rod 119 is placed at the first position, the rod 119 is placed within the through hole 117 and supported by the plate piece 116. A horizontal position, or a lock configuration, of the second plate-shaped member 103 is thus established. In the lock configuration, the second plate-shaped member 103 defines a surface substantially flush with the surfaces of the floor panels 13. The lower surface of the first plate-shaped member 102 is supported by the upper surface of the second plate-shaped member 103. As a result, the gap G is closed by the first plate-shaped member 102 and the second plate-shaped member 103. The retreat mechanism 100 establishes the first configuration in this manner as illustrated in FIG. 1 to FIG. 6. The transportation robot 24 can travel on the retreat mechanism 100 between the first section 10A and the second section 10B.

Figure 7:
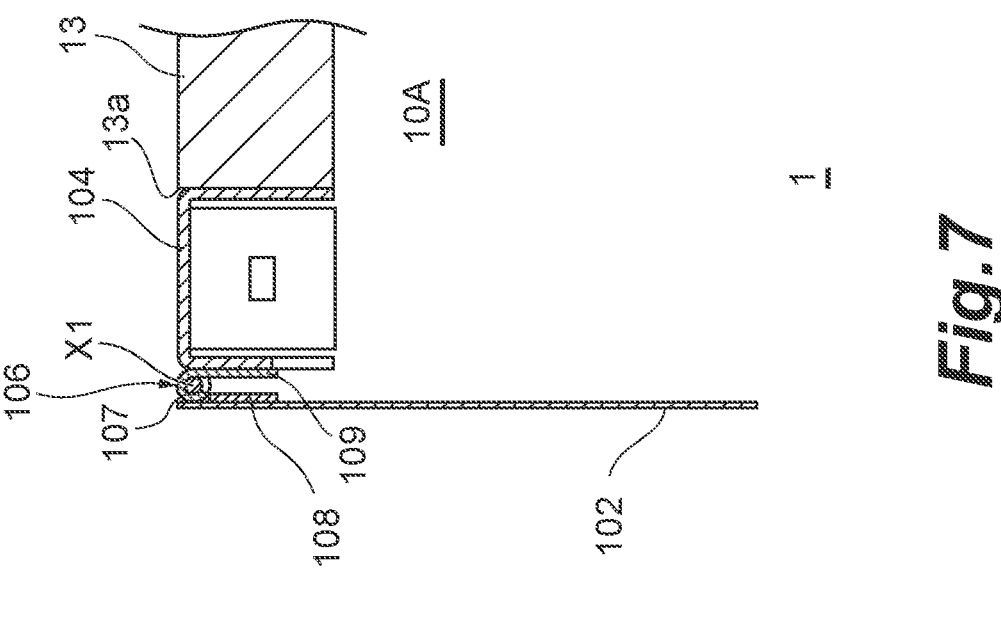
FIG. 7 is an enlarged cross-sectional view corresponding to FIG. 5, schematically illustrating a structure of the retreat mechanism 100 in a second configuration.
Figure 7:
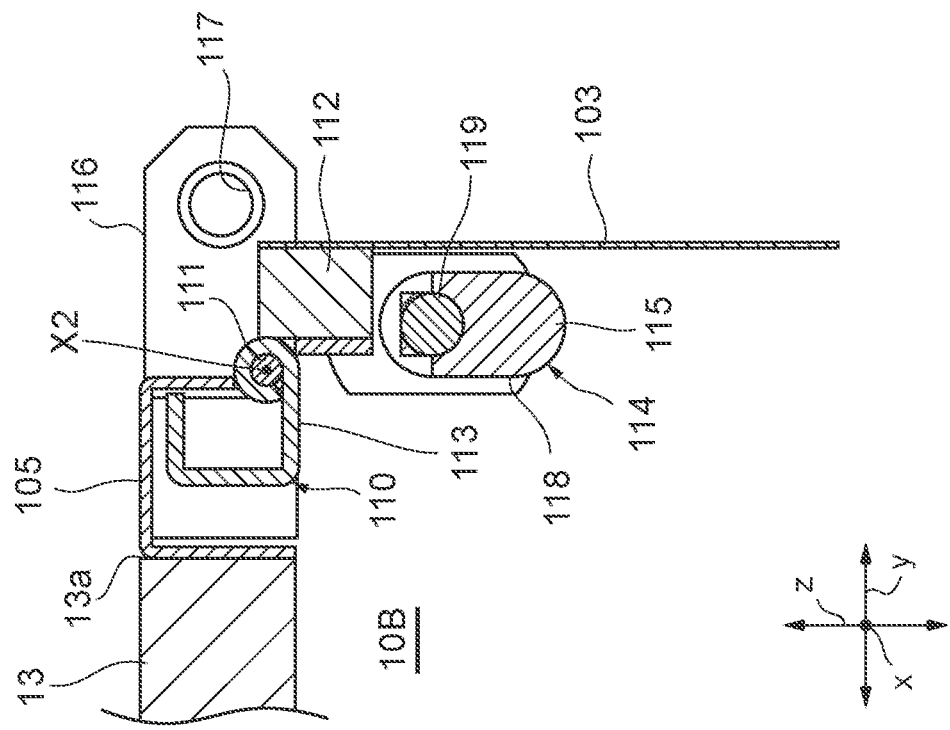

In contrast, when the rod 119 is placed at the second position, the rod 119 retreats out of the through hole 117. The rod 119 becomes unsupported by the plate piece 116. The second plate-shaped member 103 swings downward around the rotation axis X2 under its own weight. As a result, the second plate-shaped member 103 retreats from the gap G to transition to a vertical position, or an unlock position, with the surface of the second plate-shaped member 103 extending along the xz plane as illustrated in FIG. 7. Since being unsupported by the second plate-shaped member 103, the first plate-shaped member 102 swings downward around the rotation axis X1 under its own weight. The first plate-shaped member 102 retreats from the gap G to transition to the vertical position with the surface of the first plate-shaped member 102 extending along the xz plane. The retreat mechanism 100 establishes the second configuration. The gap G is unclosed in this manner.

Figure 8:
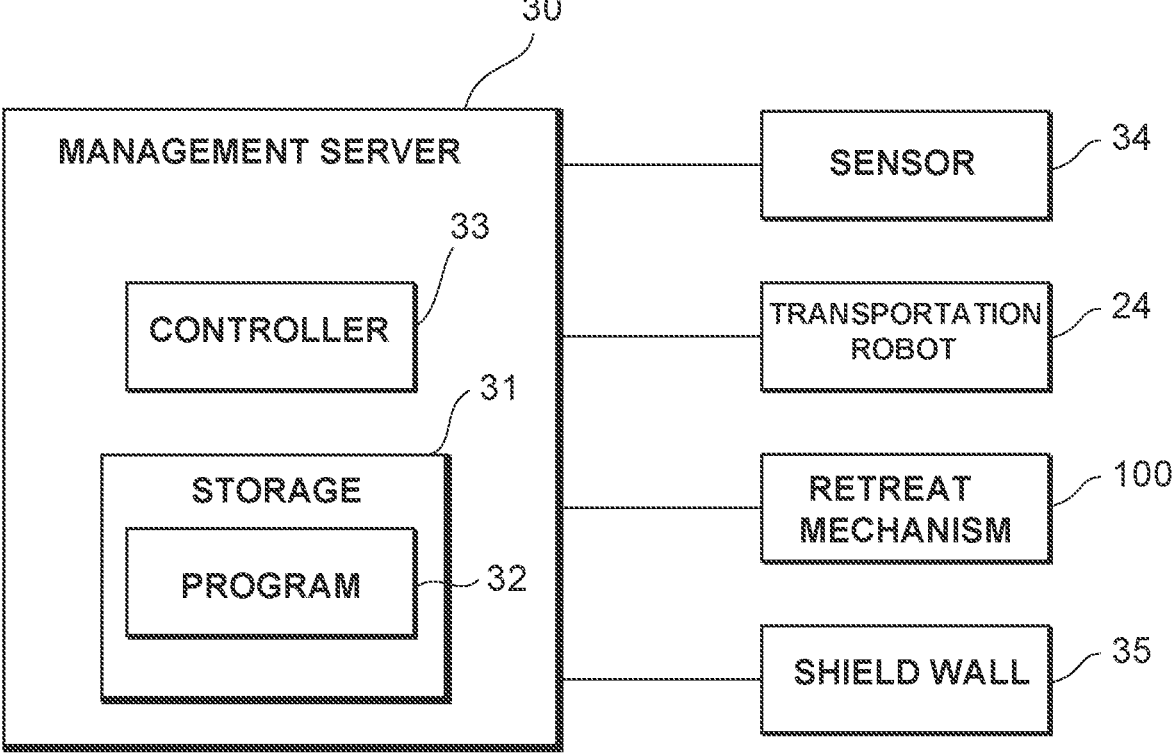
FIG. 8 is a functional block diagram illustrating a control system of the automated warehouse system 1.

FIG. 8 is a functional block diagram illustrating a control system of the automated warehouse system 1. The automated warehouse system 1 includes a management server 30 for managing a series of works in the automated warehouse system 1. The management by the management server 30 is implemented by causing a controller 33 to execute a program 32 stored in a storage 31. In the present embodiment, the program 32 includes a program for causing the retreat mechanism 100 to operate at the time of the occurrence of, for example, a fire disaster to move a shield wall such as a fire shutter downward into the gap G of the rack 10. The management server 30 may be implemented on a physical server installed in, for example, a building or may be implemented on, for example, a cloud server.

The management server 30 is connected to one or more sensors 34. The sensor 34 is, for example, a sensor capable of detecting the occurrence of a disaster, that is, a temperature sensor capable of detecting a temperature of a fire disaster or, for example, a photoelectronic sensor capable of detecting smoke from a fire disaster. The sensor 34 is attached to a ceiling of a building, the support columns 12, the lower surface of a part of the floor panels 13, or the like. The sensor 34 sends, in response to detecting heat or smoke from a fire disaster, a notification of the detection to the management server 30. The sensor 34 is connected to the management server 30 through, for example, wireless communication such as Wi-Fi® or Bluetooth®.

The management server 30 is further connected to the one or more transportation robots 24. The controller 33 manages and controls state and operation of the transportation robot 24. The controller 33 generates a command to the transportation robot 24 for, for example, each order handled by the automated warehouse system 1. The command includes, for example, information regarding the storage bin 20 storing an article specified by the order and the transportation robot 24 to be assigned for transportation of the storage bin 20. The command also includes information regarding a movement path for the transportation robot 24 to a section where the storage bin 20 is stored and a movement path for the transportation robot 24 from the section to a destination, or the picking station.

The management server 30 is connected to the actuator 115 of the retreat mechanism 100. The management server 30 can perform a control to cause a drive current to be supplied to the electric motor of the actuator 115 from a power source (not illustrated). The management server 30 is also connected to a shield wall 35. The shield wall 35 is, for example, a fire shutter installed on a ceiling surface of a building. The management server 30 can send to an opening/closing device (not illustrated) of the shield wall 35 a command to open the opening/closing device and cause the shield wall 35 to move downward. In the automated warehouse system 1, the shield wall 35 is located at a position for the shield wall 35 to be able to move downward into the gap G between the first section 10A and the second section 10B of the rack 10.

In the automated warehouse system 1 as described above, the management by the management server 30 causes the transportation robot 24 to transport the storage bin 20 placed at the section of a predetermined one of the floor panels 13 to the destination picking station. The first configuration of the retreat mechanism 100 has been established. In other words, the second plate-shaped member 103 is placed at a lock position. At this time, a case where, for example, a fire disaster occurs in the automated warehouse system 1 is assumed. First, the sensor 34 sends, responsive to the occurrence of the fire disaster, a notification of the occurrence of the fire disaster to the management server 30. In response to the reception of the notification, the controller 33 sends to the transportation robot 24 in operation in the rack 10 a command to move from the surface of the retreat mechanism 100 to the first section A or the second section 10B.

In this example, a case where, for example, a notification of the occurrence of a fire disaster is sent from the sensor 34 located in the first section 10A of the rack 10 is assumed. The controller 33 sends to the transportation robot 24 moving on the retreat mechanism 100 a command to move to the second section 10B where no fire disaster occurs. Simultaneously, the controller 33 sends to the transportation robot 24 in operation in the first section 10A a command to move from the first section 10A to the second section 10B. It should be noted that this movement includes not only the movement of the transportation robot 24 transporting the storage bin 20 but also the movement of the transportation robot 24 transporting no storage bin 20. Further, a command to move the storage bin 20 placed in the first section 10A to the second section 10B may be sent to the transportation robot 24 transporting no storage bin 20.

In response to receiving a notification of the completion of the movement to the second sections 10B from each transportation robot 24, the controller 33 causes the drive current to be simultaneously supplied to all the retreat mechanisms 100 from the power source. With the supply of the drive current, the actuator 115 causes the rod 119 to retreat out of the through hole 117 of the plate piece 116. The rod 119 is displaced from the first position to the second position. The second plate-shaped member 103 swings around the rotation axis X2 to retreat from the gap G. The second plate-shaped member 103 moves to the unlock position. Likewise, the first plate-shaped member 102 swings around the rotation axis X1 to retreat from the gap G. As a result, all the retreat mechanisms 100 synchronously establish the second configuration. The gap G is unclosed.

Figure 9:
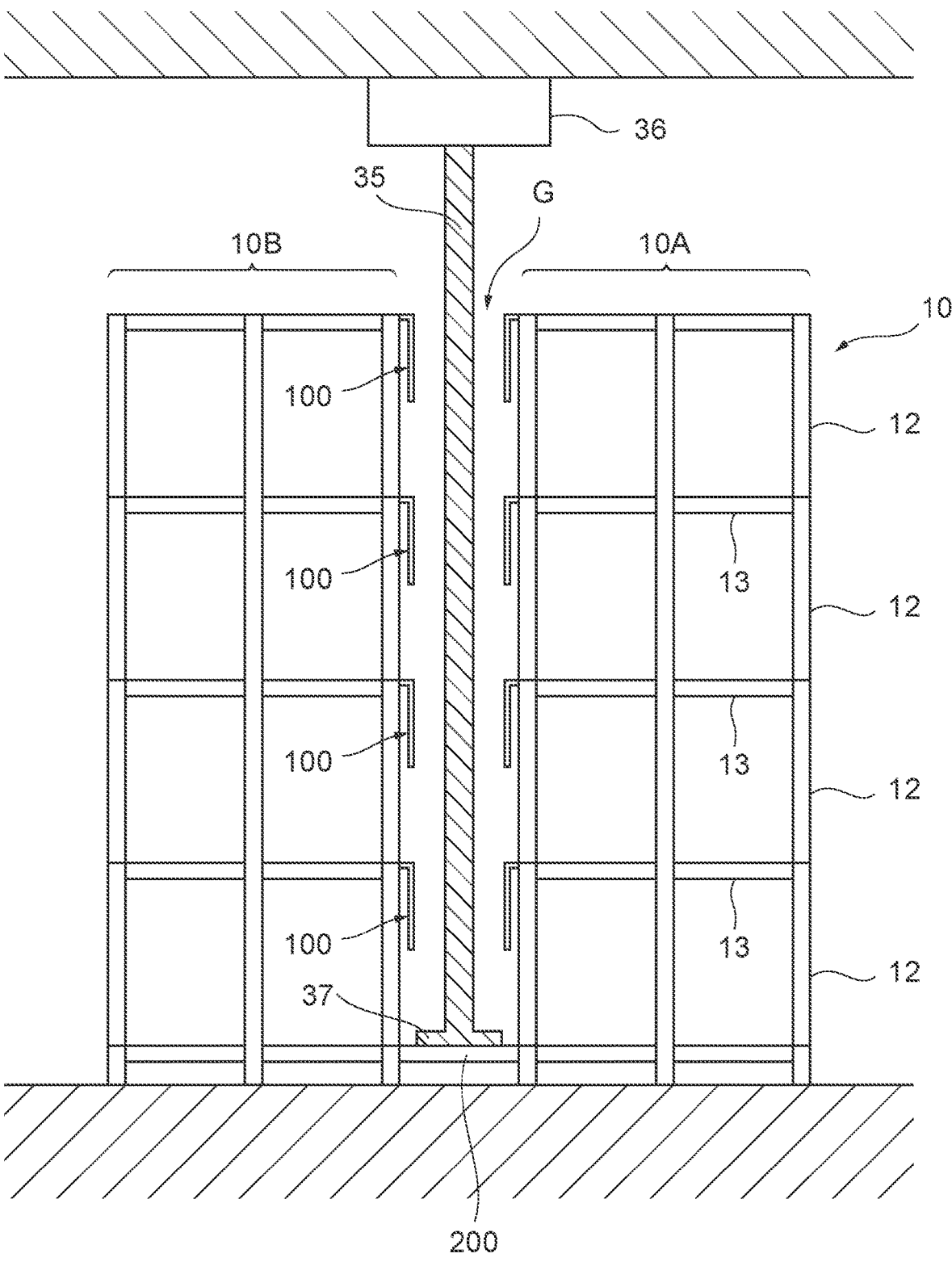
FIG. 9 is a side view schematically illustrating a structure of the automated warehouse system 1 according to the embodiment of the present disclosure.

FIG. 9 is a side view schematically illustrating a structure of the automated warehouse system 1 according to the embodiment of the present disclosure. As illustrated in FIG. 9, when all the retreat mechanisms 100 establish the second configuration, the gap G is unclosed. The gap G divides the rack 10 into the first section 10A and the second section 10B. The controller 33 sends an opening command to the opening/closing mechanism 36 of the shield wall 35. In response to the opening/closing mechanism 36 being opened, the shield wall 35 moves downward into the gap G from above in the z-axis direction. The closure member 200 is located in the gap G of the floor 11 corresponding to the first level. Thus, when the shield wall 35 is caused to move downward to a maximum extent, a seat plate 37 at a lower end of the shield wall 35 is received by the closure member 200. The shield wall 35 shields the first section 10A and the second section 10B from each other in this manner. It is possible to reliably avoid the spread of the fire disaster occurring in the first section 10A to the second section 10B. It is possible to avoid damage to the article in the storage bin 20 moved to the second section 10B.

In the automated warehouse system 1 as described above, each of the floors 11 of the rack 10 includes the plurality of floor panels 13 adjacent to each other and the plurality of floors 11 are supported by the support columns 12. The gap G between the first section 10A and the second section 10B is closed by the retreat mechanism 100 in the first configuration. The travel of the transportation robot 24 along the floors 11 is permitted. In contrast, at the time of the occurrence of a fire disaster or the like, the retreat mechanism 100 in the second configuration uncloses the gap G. The shield wall 35 can enter the gap G. In order to form the gap G, it is only necessary to cause the retreat mechanism 100 permitting the travel of the transportation robot 24 to retreat from the gap G. The simple configuration allows for deployment of the shield wall 35.

In addition, the retreat mechanism 100 is established by overlap between the first plate-shaped member 102 attached to one of the floor panels 13 and the second plate-shaped member 103 attached to the other floor panel 13. A swing of the second plate-shaped member 103 around the rotation axis X2 causes the first plate-shaped member 102 to likewise swing around the rotation axis X1. Such an active displacement of only the second plate-shaped member 103 makes it possible to passively displace the first plate-shaped member 102. In order to implement the above configuration, it is only necessary to incorporate the lock mechanism 114 for placing the second plate-shaped member 103 at the lock position and the unlock position. In the automated warehouse system 1, the gap G can be unclosed by the simple configuration.

In the automated warehouse system 1 as described above, the case where a fire disaster occurs is assumed; however, the retreat mechanism 100 may be configured to also come into operation at the time of the occurrence of an earthquake. In other words, the sensor 34 may further include, for example, an acceleration sensor capable of detecting a shock during the occurrence of an earthquake. The sensor 34 can send, responsive to detecting a shock of an earthquake, a notification including a magnitude of the shock of the earthquake to the controller 33. In response to the magnitude of the shock of the earthquake exceeding a threshold, the controller 33 sends to the transportation robot 24 a command to move from the surface of the retreat mechanism 100 to the first section A or the second section 10B. Unlike at the time of the occurrence of a fire disaster, the transportation robot 24 only has to move to either the first section A or the second section 10B in a case of an earthquake. After that, the controller 33 causes the retreat mechanism 100 to be displaced into the second configuration and then causes the shield wall 35 to move downward into the gap G. Thus, the simple configuration allows for deployment of the shield wall 35 as described before.

It should be noted that the lengths L1, L2 of the first plate-shaped member 102 and the second plate-shaped member 103 are smaller than the distance d of the gap G. In other words, respective clearances are formed between an outer edge of the first plate-shaped member 102 and the other floor panel 13 and between an outer edge of the second plate-shaped member 103 and the one floor panel 13. For example, at an initial phase of the occurrence of an earthquake, the rack 10 shakes due to the earthquake and thus the first section 10A and the second section 10B each shake. The shake is absorbed by the clearance between the first plate-shaped member 102 beside a first section 10A and the second section 10B and by the clearance between the second plate-shaped member 103 beside a second section 10B and the first section 10A. A mutual interference between each of the first plate-shaped member 102 and the second plate-shaped member 103 and the floor 11 is avoided.

Figure 10:
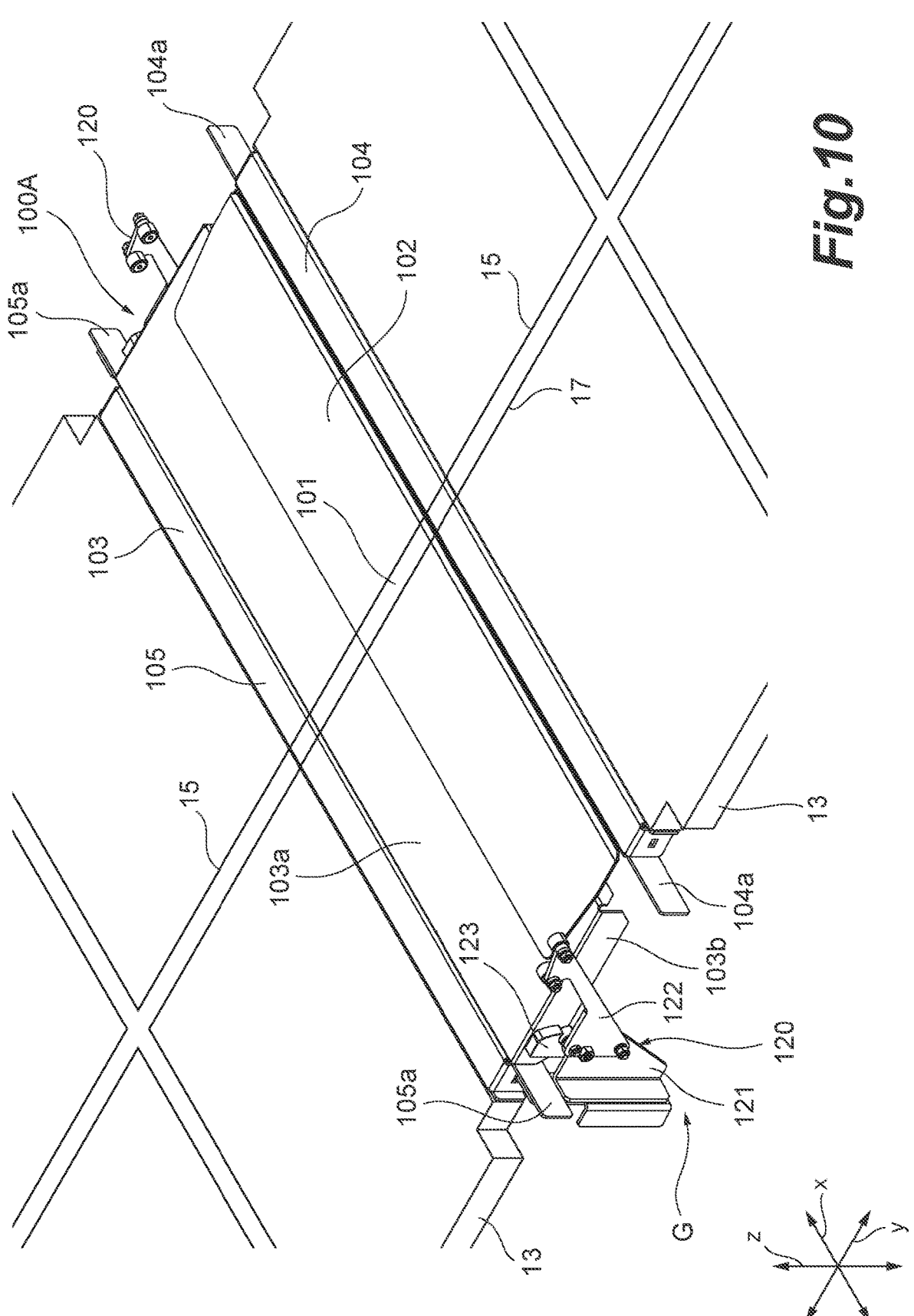
FIG. 10 is a perspective view schematically illustrating a structure of a retreat mechanism 100A according to a second specific example.
Figure 11:
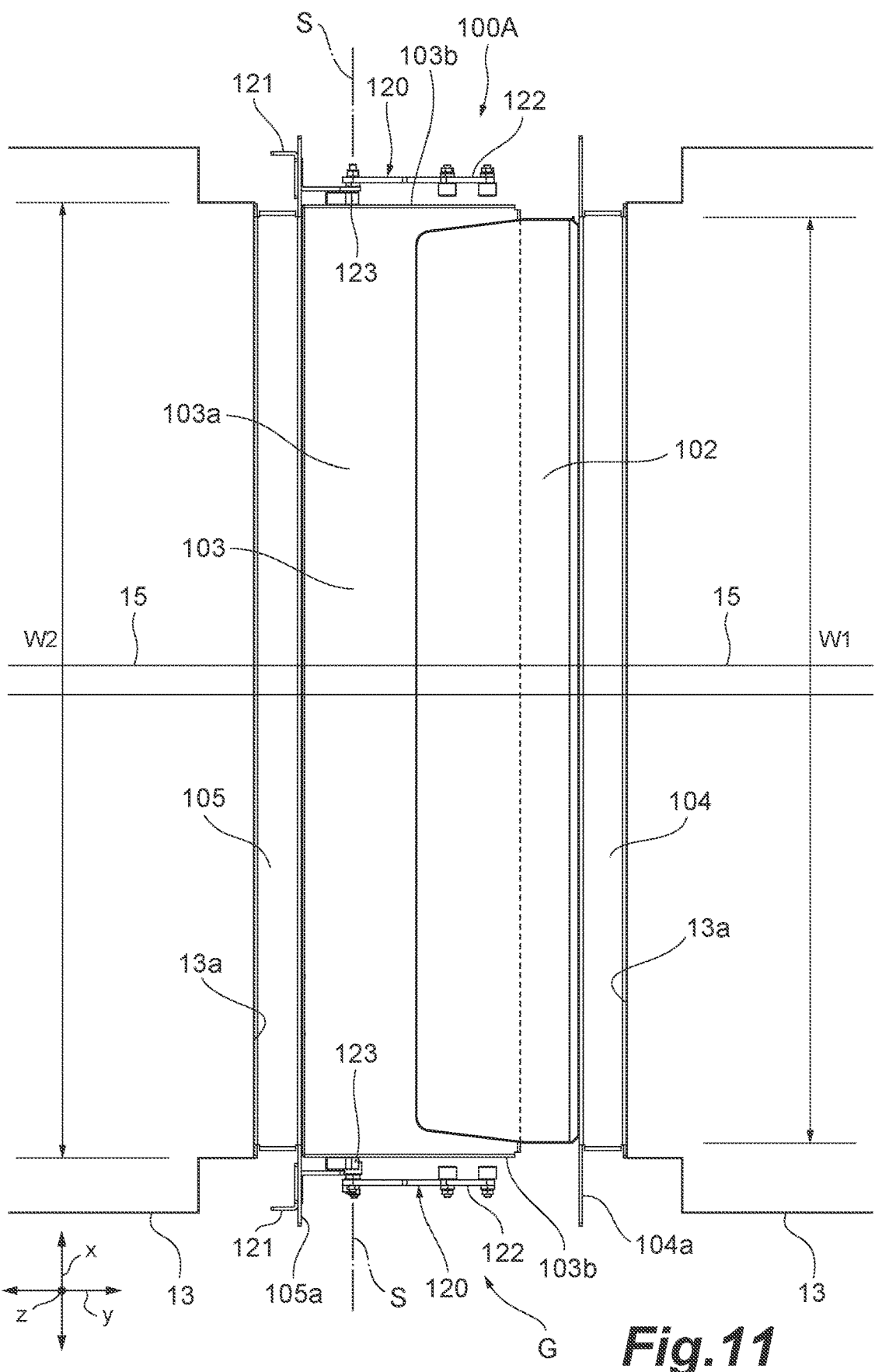
FIG. 11 is a plan view schematically illustrating the structure of the retreat mechanism 100A according to the second specific example.

FIG. 10 is a perspective view schematically illustrating a structure of a retreat mechanism 100A according to a second specific example. FIG. 11 is a plan view schematically illustrating the structure of the retreat mechanism 100A according to the second specific example. It should be noted that the same reference numeral is used to refer to a component similar to a component of the retreat mechanism 100 according to the first specific example in FIG. 10 and subsequent drawings and a redundant description will be omitted. In addition, the illustration of the support columns 12 is omitted in FIG. 10 and the subsequent drawings. As illustrated in FIG. 10 and FIG. 11, the retreat mechanism 100A according to the second specific example includes a lock mechanism 120 in place of the above-described lock mechanism 114. In this example, the retreat mechanism 100A includes a pair of lock mechanisms 120 located at opposite ends in the x-axis direction of the second plate-shaped member 103.

Contrary to the configuration of the retreat mechanism 100 according to the first specific example, the second width W2 of the second plate-shaped member 103 is larger than the first width W1 of the first plate-shaped member 102 as illustrated in FIG. 11. In addition, the second width W2 is defined as being substantially the same as a width of the second attachment member 105. Referring back to FIG. 10, the second plate-shaped member 103 includes an upper plate 103a extending along the xy plane and a pair of side plates 103b bent downward from opposite side edges in the x-axis direction of the upper plate 103a. In this example, the side edges of the upper plate 103a are defined along the y-axis direction. The side plates 103b each extends, for example, in a form of a flat plate along the yz plane. The pair of lock mechanisms 120 are located adjacent to the respective opposite side edges in the x-axis direction of the upper plate 103a.

Figure 12:
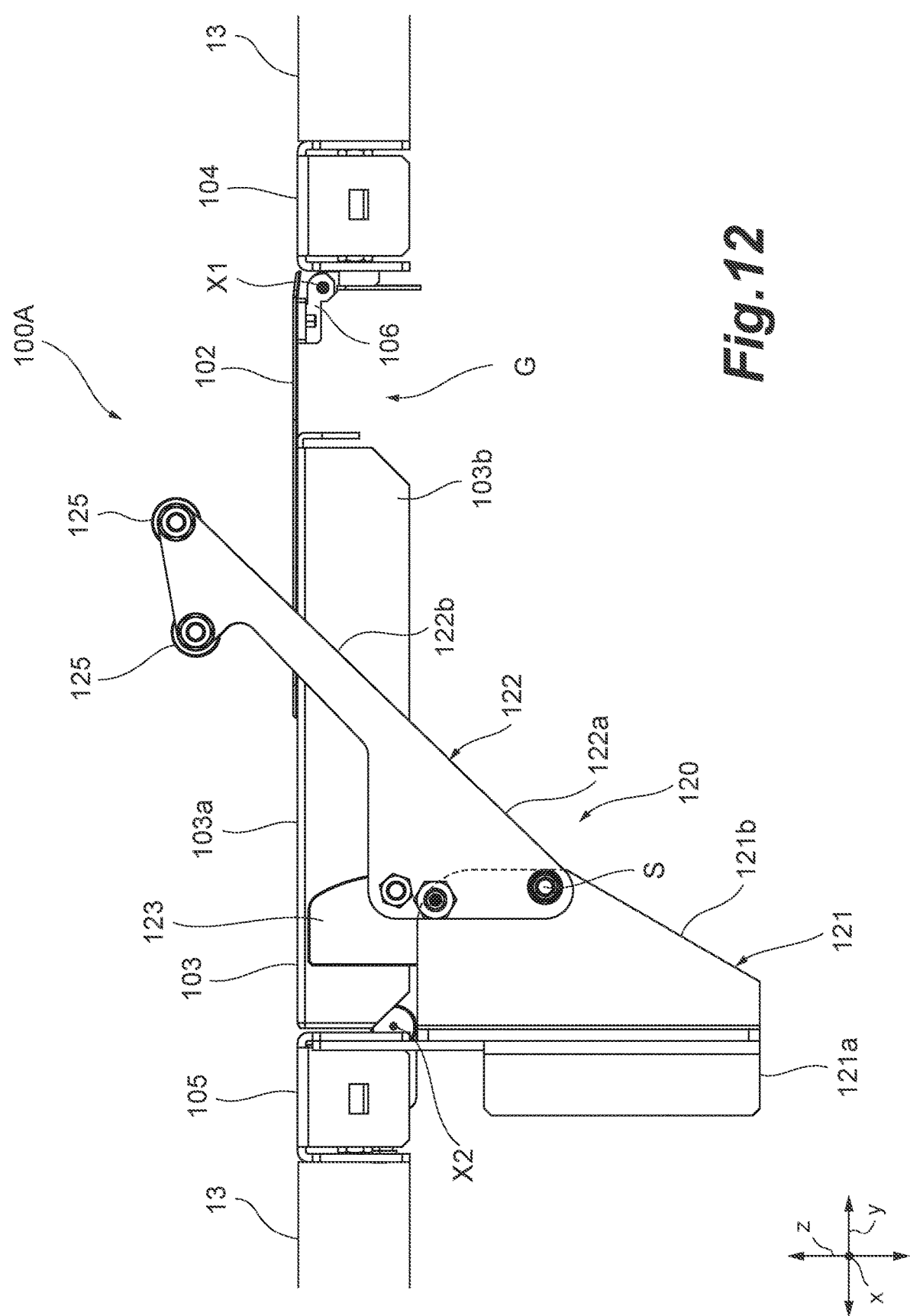
FIG. 12 is an enlarged side view schematically illustrating the structure of the retreat mechanism 100A according to the second specific example.
Figure 13:
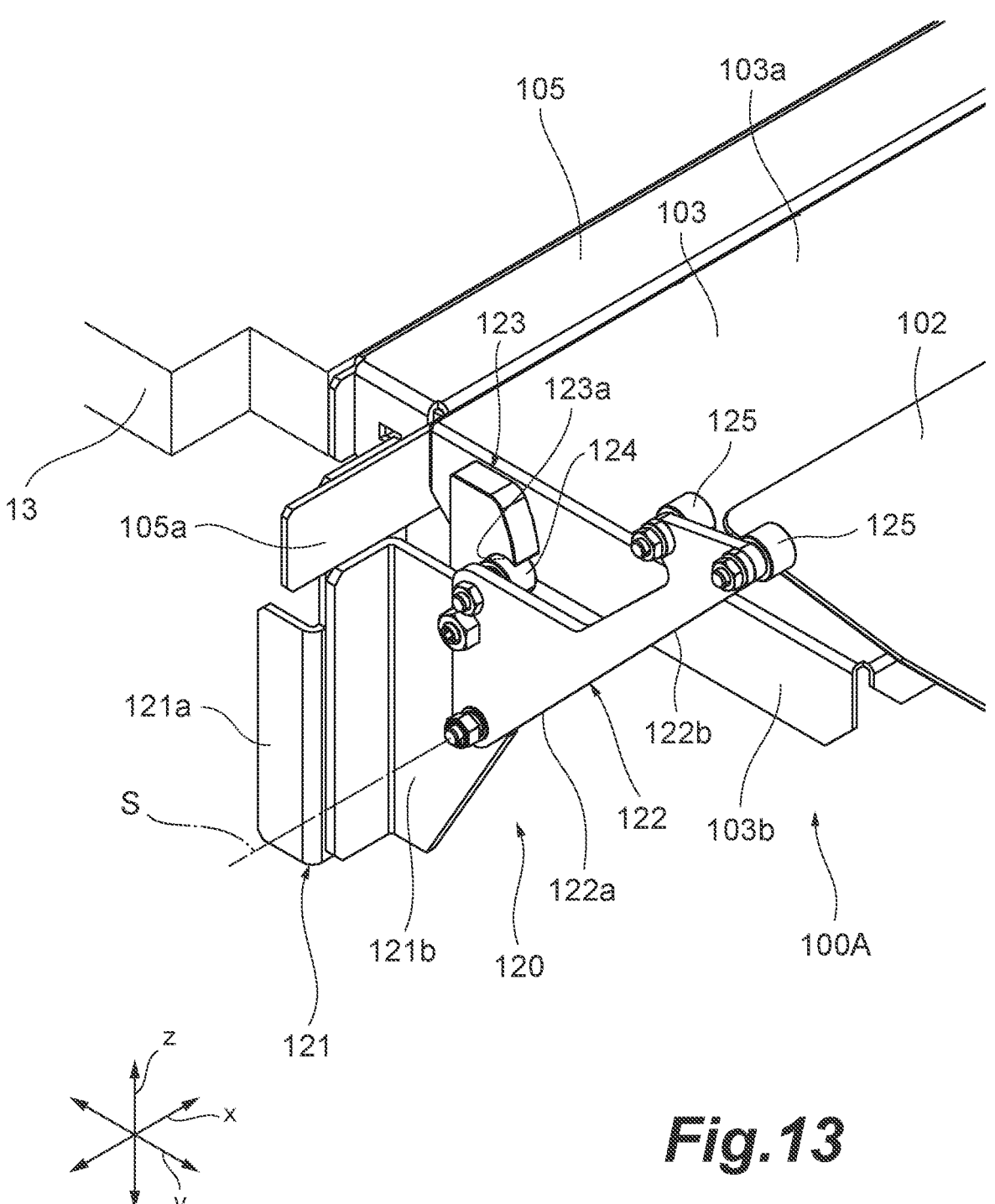
FIG. 13 is an enlarged perspective view schematically illustrating the structure of the retreat mechanism 100A according to the second specific example.

FIG. 12 is an enlarged side view schematically illustrating the structure of the retreat mechanism 100A according to the second specific example. FIG. 13 is an enlarged perspective view schematically illustrating the structure of the retreat mechanism 100A according to the second specific example. It should be noted that the pair of lock mechanisms 120 have plane-symmetric structures with respect to the yz plane defined at a center point between the pair of lock mechanisms 120; therefore, description will be made on one of the lock mechanisms 120. As illustrated in FIG. 12 and FIG. 13, the lock mechanism 120 includes a bracket 121 attached to, for example, the second attachment member 105, a swinging member 122 attached to the bracket 121 and swingable around a swing axis S between a first position and a second position, and an engagement member 123 attached to the side plate 103b of the second plate-shaped member 103.

In FIG. 12 and FIG. 13, the swinging member 122 is placed at the first position. When the swinging member 122 is thus placed at the first position, the second plate-shaped member 103 is placed at the lock position. In other words, the first configuration of the retreat mechanism 100A is established. The first plate-shaped member 102 is received by the upper surface of the second plate-shaped member 103. The gap G is thus closed by the first plate-shaped member 102 and the second plate-shaped member 103. In contrast, when the swinging member 122 swings around the swing axis S to be placed at the second position, the second plate-shaped member 103 is placed at the unlock position as described later. The second configuration of the retreat mechanism 100A is established. The gap G is unclosed.

The bracket 121 includes, for example, a first portion 121a attached to the second attachment member 105 and a second portion 121b attached to the first portion 121a. In this example, each of the first portion 121a and the second portion 121b is, for example, in an L-shape in a plan view as viewed from above in the z-axis direction. The first portion 121a is fixed to, for example, a projection 105a of the second attachment member 105 with, for example, a screw (not illustrated). The second portion 121b defines, for example, a portion extending in a form of a flat plate along the yz plane. As the part of the second portion 121b being drawn with a dotted line in FIG. 12, the portion in the form of a flat plate of the second portion 121b is defined substantially in a trapezoidal shape in a side view as viewed in the y-axis direction.

The swinging member 122 is supported by the second portion 121b of the bracket 121 and swingable around the swing axis S. The swing axis S is defined in parallel with the rotation axis X1 and the rotation axis X2 of the first plate-shaped member 102 and the second plate-shaped member 103. In this example, the swing axis S is defined at a lower position in the z-axis direction than the rotation axis X1 and the rotation axis X2. The swinging member 122 extends, for example, in a form of a flat plate along the yz plane. The swinging member 122 includes, for example, a proximal end portion 122a defining the swing axis S and a distal end portion 122b extending from the proximal end portion 122a. The proximal end portion 122a is defined, for example, substantially in a triangular shape in a side view as viewed in the y-axis direction. The distal end portion 122b, for example, extends in an elongated manner from one of the corners of the triangle of the proximal end portion 122a.

As is apparent from FIG. 13, a first projecting portion 124 is attached to the proximal end portion 122a of the swinging member 122 and the first projecting portion 124 projects in the x-axis direction from an inner surface of the proximal end portion 122a in parallel with the swing axis S. The first projecting portion 124 is a columnar portion defining a cylindrical outer peripheral surface around a center axis orthogonal to the inner surface of the proximal end portion 122a. The first projecting portion 124 is engaged with the engagement member 123 attached to the side plate 103b of the second plate-shaped member 103. The engagement member 123 defines an engagement groove 123a partially defining a cylindrical inner peripheral surface around a center axis orthogonal to an outer surface of the side plate 103b. The first projecting portion 124 is engaged with the engagement groove 123a. With the establishment of the engagement, the retreat mechanism 100A establishes the first configuration.

For example, a pair of second projecting portions 125 are attached to the distal end portion 122b of the swinging member 122 and the second projecting portions 125 project in the x-axis direction from an inner surface of the distal end portion 122b in parallel with the swing axis S. Each of the second projecting portions 125 is a columnar portion defining a cylindrical outer peripheral surface around a center axis orthogonal to the inner surface of the distal end portion 122b. The pair of second projecting portions 125 are spaced from each other at a predetermined interval substantially in a horizontal direction. In a state where the first projecting portion 124 is engaged with the engagement groove 123a, a part of the distal end portion 122b is placed at a higher position in the z-axis direction than the upper surfaces of the first plate-shaped member 102 and the second plate-shaped member 103 as is apparent from FIG. 12. In this example, the second projecting portion 125 further distant from the proximal end portion 122a is placed at a higher position in the z-axis direction than the second projecting portion 125 closer to the proximal end portion 122a.

Figure 14:
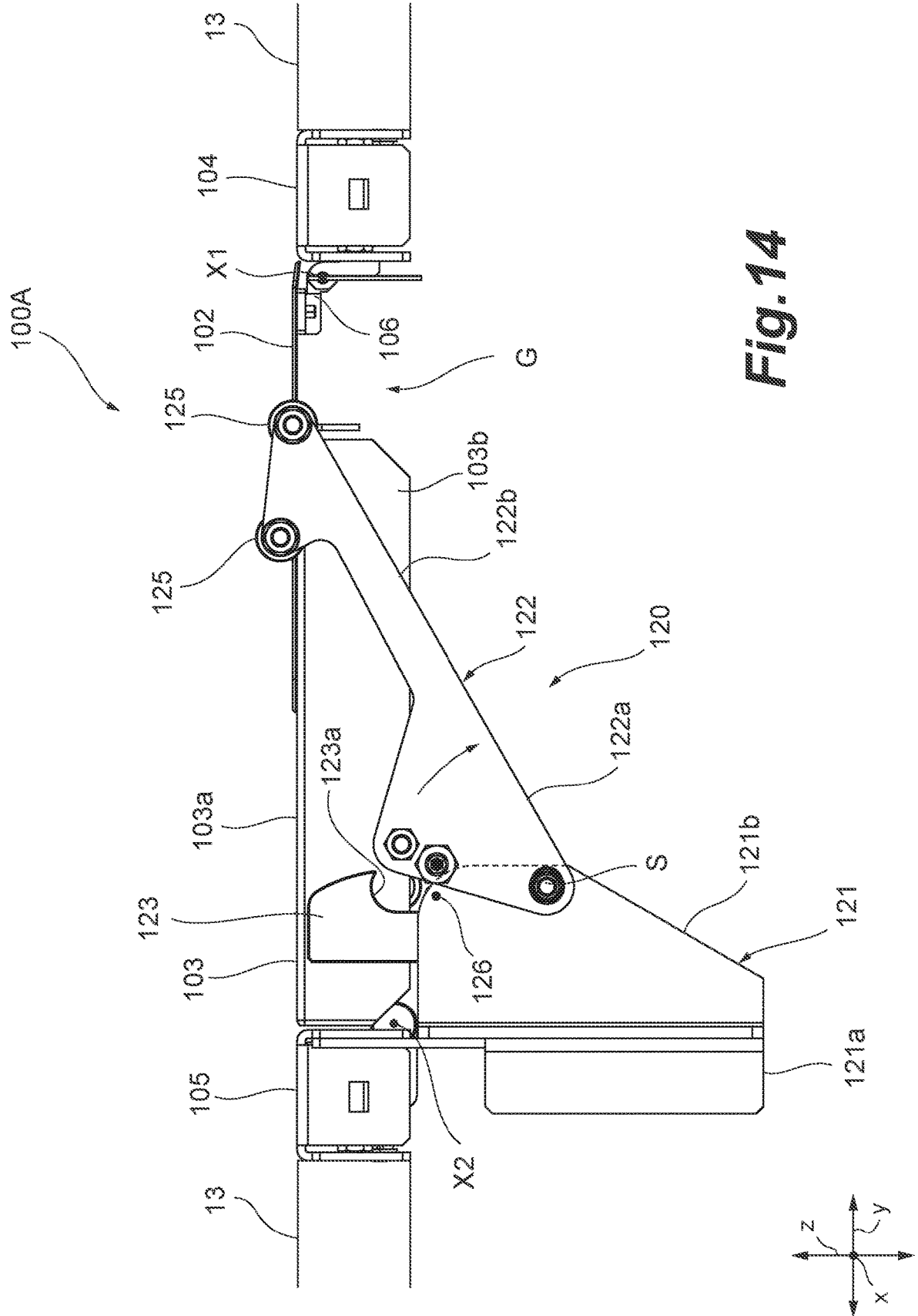
FIG. 14 is an enlarged side view schematically illustrating the structure of the retreat mechanism 100A according to the second specific example.

FIG. 14 is an enlarged side view schematically illustrating the structure of the retreat mechanism 100A according to the second specific example. As illustrated in FIG. 14, the swinging member 122 is displaceable from the first position to the second position around the swing axis S. A swing of the swinging member 122 to the second position causes the first projecting portion 124 of the proximal end portion 122a to come out of the engagement groove 123a of the engagement member 123. The engagement between the first projecting portion 124 and the engagement groove 123a is canceled. A swing of the second plate-shaped member 103 around the rotation axis X2 is permitted. As a result, the second plate-shaped member 103 swings around the rotation axis X2 to retreat from the gap G. The second plate-shaped member 103 moves to the unlock position. Likewise, the first plate-shaped member 102 swings around the rotation axis X1 to retreat from the gap G. The second configuration of the retreat mechanism 100A is thus established.

Figure 15:
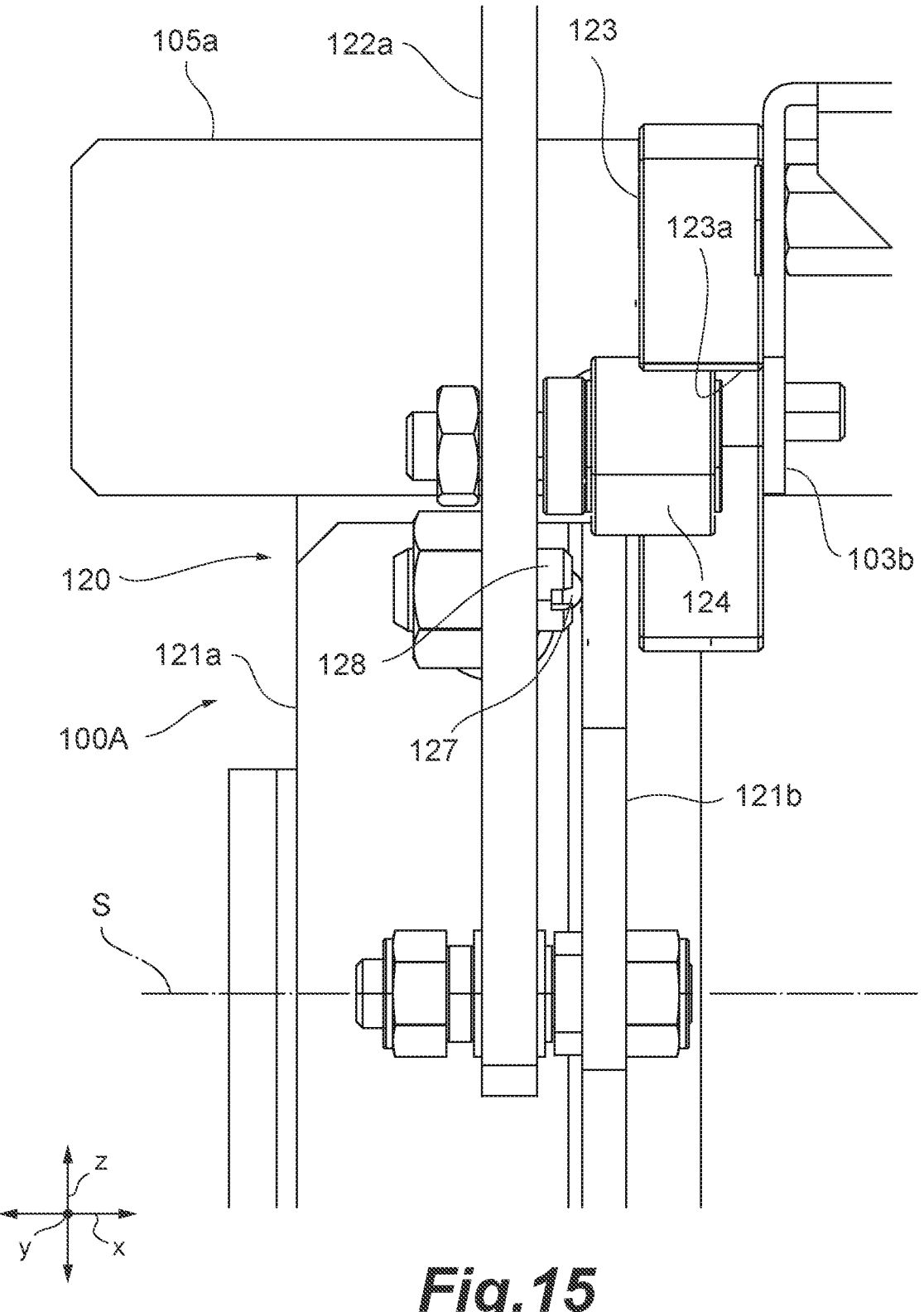
FIG. 15 is an enlarged view of a lock mechanism 120 as viewed in a y-axis direction in a case where a swinging member 122 is placed at a first position.

FIG. 15 is an enlarged view of the lock mechanism 120 as viewed in the y-axis direction in a case where the swinging member 122 is placed at the first position. Referring to FIG. 12 to FIG. 15 together, the lock mechanism 120 includes a recess 126 (see FIG. 14) formed in an outer surface of the second portion 121b of the bracket 121 and a ball 127 held by the proximal end portion 122a of the swinging member 122 and urged toward the recess 126. The ball 127 is urged into the recess 126 by, for example, a resilience of a spring (not illustrated). In a case where the swinging member 122 is placed at the first position, when the ball 127 is received in the recess 126, the swinging member 122 is held at the first position.

In contrast, when the swinging member 122 swings from the first position toward the second position against the resilience of the spring, the ball 127 comes out of the recess 126. The resilience of the spring causes the ball 127 to slide on the outer surface of the second portion 121b. When the swinging member 122 is placed at the second position, the ball 127 is placed outside the second portion 121b (see, for example, FIG. 14). It should be noted that the ball 127 is held by a holding member 128 attached to the second portion 121b. The spring is located within the holding member 128. The holding member 128 serves to prevent the ball 127 from dropping out of the holding member 128 irrespective of the resilience of the spring.

In the automated warehouse system 1 incorporated with the retreat mechanism 100A as described above, in a case of the occurrence of a disaster such as a fire disaster or an earthquake, the controller 33 sends, to the transportation robot 24 moving on the retreat mechanism 100, a command to move to the first section 10A or the second section 10B as described before. In response to receiving a notification of the completion of the movement to the first section 10A or the second section 10B from each transportation robot 24, the controller 33 sends the opening command to the opening/closing mechanism 36 of the shield wall 35. In response to receiving the opening command, the opening/closing mechanism 36 is opened. The shield wall 35 moves downward into the gap G from above in the z-axis direction.

Figure 16:
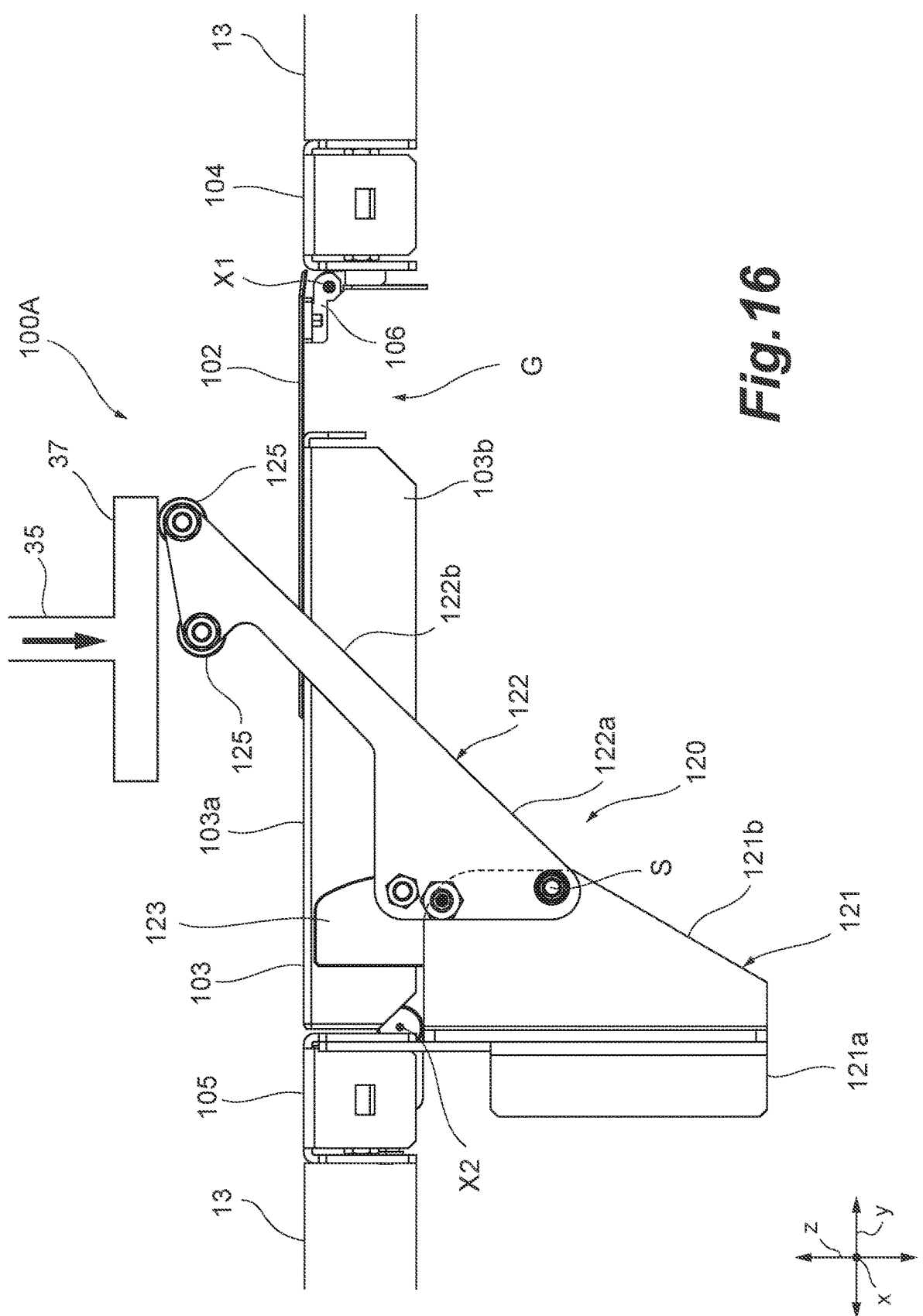
FIG. 16 is an enlarged side view of the retreat mechanism 100A, illustrating a stage where a shield wall 35 moves downward with respect to the retreat mechanism 100A.
Figure 17:
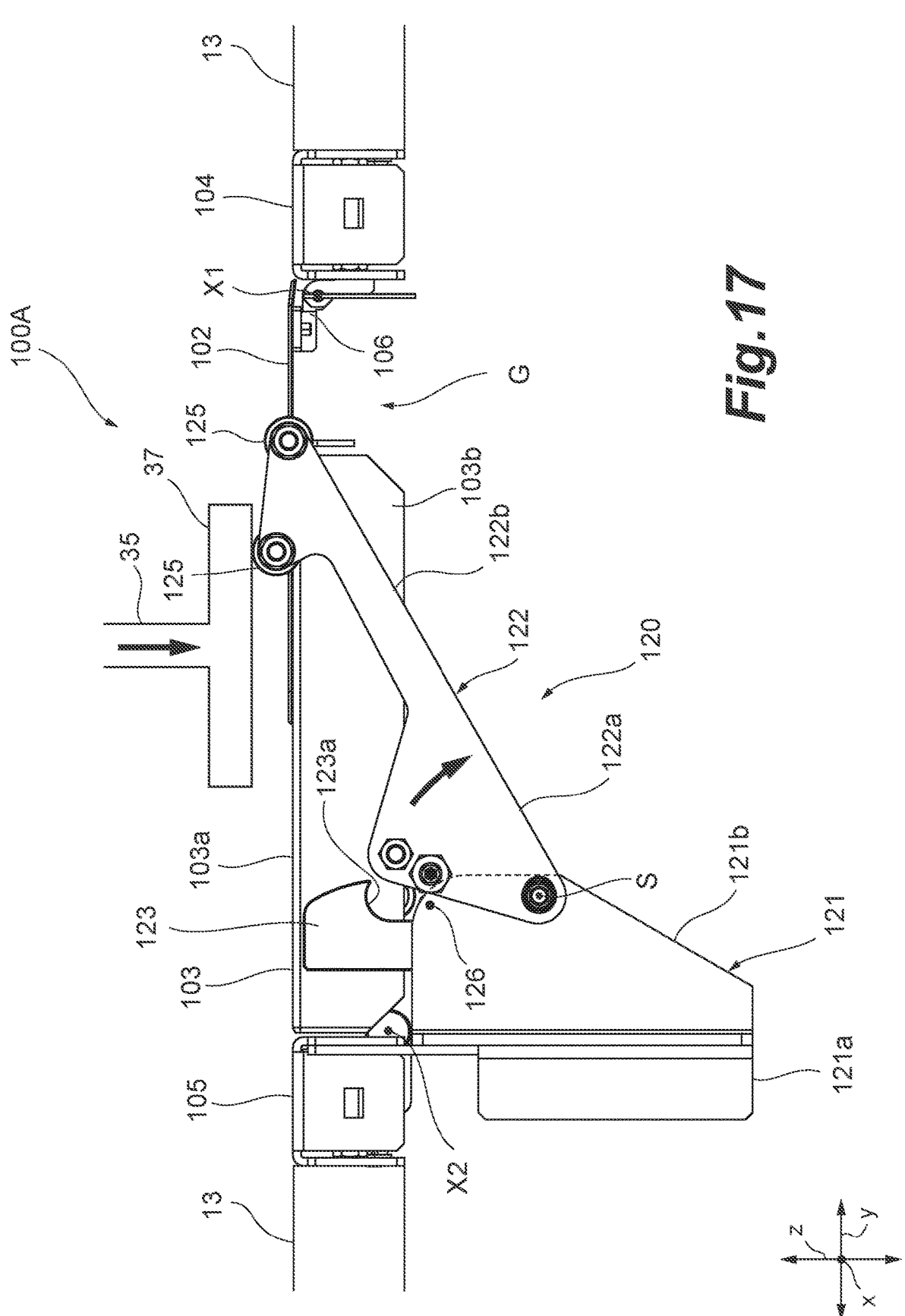
FIG. 17 is an enlarged side view of the retreat mechanism 100A, illustrating the stage where the shield wall 35 moves downward with respect to the retreat mechanism 100A.
Figure 18:
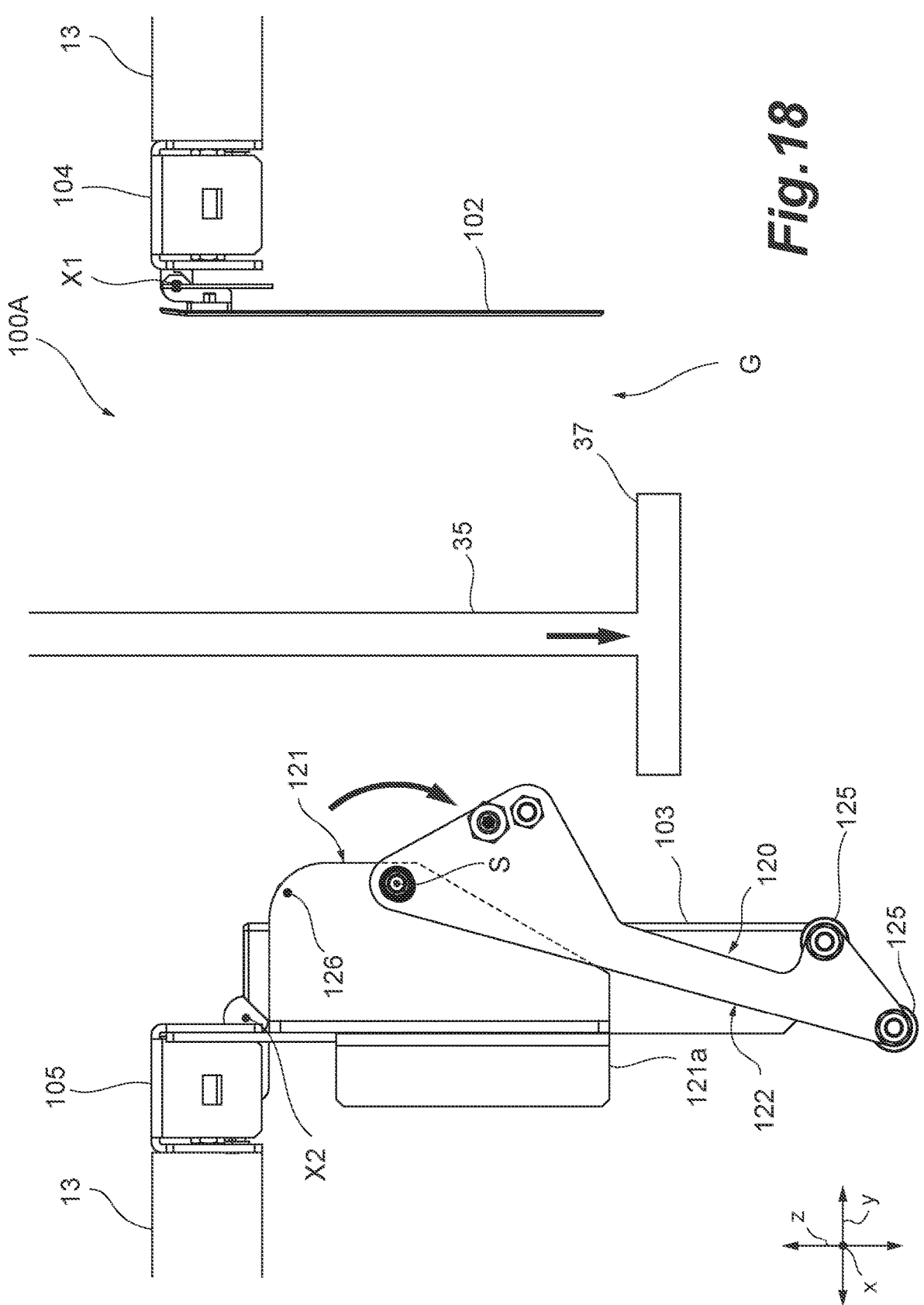
FIG. 18 is an enlarged side view of the retreat mechanism 100A, illustrating the stage where the shield wall 35 moves downward with respect to the retreat mechanism 100A.

FIG. 16 to FIG. 18 are enlarged side views of the retreat mechanism 100A, illustrating a stage where the shield wall 35 moves downward with respect to the retreat mechanism 100A. As illustrated in FIG. 16, the first configuration of the retreat mechanism 100A is established. In other words, the swinging member 122 is placed at the first position and the first plate-shaped member 102 and the second plate-shaped member 103 are at the lock position to close the gap G. At this time, a downward movement of the shield wall 35 from above in the z-axis direction causes a lower surface of the seat plate 37 of the shield wall 35 to come into contact with the second projecting portion 125 of the swinging member 122. A further downward movement of the shield wall 35 causes the seat plate 37 to press down the second projecting portion 125. The pressing causes the swinging member 122 to swing around the swing axis S from the first position toward the second position.

As a result, the first projecting portion 124 comes out of the engagement groove 123a as illustrated in FIG. 17. The second plate-shaped member 103 becomes unsupported by the first projecting portion 124 of the swinging member 122. The second plate-shaped member 103 swings around the rotation axis X2 to retreat from the gap G. The second plate-shaped member 103 is displaced to the unlock position. Likewise, the first plate-shaped member 102 swings around the rotation axis X1 to retreat from the gap G. Thus, with the downward movement of the shield wall 35, the shield wall 35 uncloses the gap G. As illustrated in FIG. 18, a further downward movement of the shield wall 35 causes the swinging member 122 to further rotate around the swing axis S. The swinging member 122 is pressed out of a downward movement path for the shield wall 35. The seat plate 37 of the shield wall 35 is thus received by the closure member 200 at the floor 11 corresponding to the first level as described before.

In the retreat mechanism 100A according to the second specific example as described above, the lock mechanism 120 displaces the second plate-shaped member 103 from the lock position to the unlock position on the basis of contact with the seat plate 37 of the shield wall 35. In other words, the retreat mechanism 100A requires none of the actuator 115, etc. of the above-described retreat mechanism 100. It is not necessary for the controller 33 to send to the retreat mechanism 100A a command for causing the retreat mechanism 100A to operate. Therefore, the retreat mechanism 100A according to the second specific example enables simplifying the configuration of the automated warehouse system 1 as compared with the above-described retreat mechanism 100 according to the first specific example.

In the automated warehouse system 1 as described above, description is made on a mode where the rack 10 is divided into the first section 10A and the second section 10B by the single gap G by way of example; however, the rack 10 may have gaps G at a plurality of positions in accordance with an installation position of the shield wall 35. In addition, in the above-described embodiment, the single retreat mechanism 100 is located between the one opposite pair of the floor panels 13; however, the single retreat mechanism 100 may be located between two or more opposite pairs of the floor panels 13. In this case, for example, it is only sufficient if the first plate-shaped member 102 and the second plate-shaped member 103 have widths equivalent to the long sides 13*a* of the two floor panels 13. In addition, for example, the first plate-shaped member 102 may be omitted. In other words, the second plate-shaped member 103 may have the length L2 equivalent to the distance d of the gap G.

Herein, some embodiments of the subject of the present disclosure are disclosed and examples are referred to for the purpose of enabling those skilled in the art to implement an embodiment of the subject of the present disclosure, the embodiment including manufacturing and use of a device or a system and performing an incorporated method. The patentable scope of the subject of the present disclosure is defined by claims and may include another example that would occur to those skilled in the art. Such an example is supposed to be within the scope of the claims, provided that it includes a component not different from the wordings in the claims or includes an equivalent component with an unsubstantial difference from the wordings in the claims.

The invention claimed is:

1. An automated warehouse system comprising:
   a rack including a plurality of floors each including a plurality of floor panels adjacent to each other, the floors permitting a transportation robot to travel along surfaces of the floors, the plurality of floors being divided into a first section and a second section spaced from each other with a gap in between; and
   a retreat mechanism including a first member located adjacent to the floors in the first section and swingable around a first axis parallel with the surfaces of the floors and a second member located adjacent to the floors in the second section and swingable around a second axis parallel with the surfaces of the floors, the retreat mechanism establishing a first configuration to be located in the gap to permit the transportation robot to travel between the first section and the second section and a second configuration to retreat from the gap to unclose the gap, wherein
   when the retreat mechanism establishes the first configuration, the second member supports the first member on an upper surface of the second member, wherein
   when the retreat mechanism establishes the second configuration, a shield wall becomes receivable into the gap, the shield wall shielding the first section and the second section from each other.

2. The automated warehouse system according to claim 1, wherein the retreat mechanism further includes a lock mechanism displacing the second member between a lock position and an unlock position, the second member at the lock position supporting the first member on the upper surface of the second member to establish the first configuration, the second member at the unlock position swinging around the second axis to retreat from the gap to establish the second configuration, wherein
   when the unlock position is established, the first member becomes unsupported by the second member and swings around the first axis to retreat from the gap.

3. The automated warehouse system according to claim 2, wherein the lock mechanism displaces the second member to the unlock position on a basis of a contact with the shield wall.

4. The automated warehouse system according to claim 3, wherein a plurality of retreat mechanisms including the retreat mechanism synchronously transition from the first configuration to the second configuration.

5. The automated warehouse system according to claim 2, wherein warning of occurrence of a disaster triggers the second member to be displaced from the lock position to the unlock position.

6. The automated warehouse system according to claim 2, wherein the second member is displaced from the lock position to the unlock position after the transportation robot retreats from a surface of the retreat mechanism onto the floors.

7. The automated warehouse system according to claim 1, wherein the retreat mechanism is located between an adjacent pair of the floor panels opposed to each other with the gap in between.

8. The automated warehouse system according to claim 1, wherein a length from an inner edge to an outer edge of the first member is smaller than a dimension of the gap.

9. The automated warehouse system according to claim 1, wherein a length from an inner edge to an outer edge of the second member is smaller than a dimension of the gap.

10. The automated warehouse system according to claim 1, further comprising a closure member located in the gap defined on a first level of the rack.

11. The automated warehouse system according to claim 1, wherein the rack includes a plurality of support columns supporting the floors, the retreat mechanism is located between a pair of the support columns respectively in the first section and second section.

12. A retreat mechanism incorporated into an automated warehouse system including a rack having a plurality of floors each including a plurality of floor panels adjacent to each other, the plurality of floors being divided into a first section and a second section spaced from each other with a gap in between,
   the retreat mechanism comprising:
   a first member located adjacent to the floors in the first section and swingable around a first axis parallel with surfaces of the floors; and
   a second member located adjacent to the floors in the second section and swingable around a second axis parallel with the surfaces of the floors;
   the retreat mechanism being configurable in a first configuration to be located in the gap to permit a transportation robot to travel between the first section and the second section; and
   the retreat mechanism being configurable in a second configuration to retreat from the gap to unclose the gap, wherein
   when the retreat mechanism establishes the first configuration, the second member supports the first member on an upper surface of the second member,
   when the retreat mechanism establishes the second configuration, a shield wall becomes receivable into the gap, the shield wall shielding the first section and the second section from each other.

13. The retreat mechanism according to claim 12, further including a lock mechanism displacing the second member between a lock position and an unlock position, the second member at the lock position supporting the first member on the upper surface of the second member to establish the first configuration, the second member at the unlock position swinging around the second axis to retreat from the gap to establish the second configuration, wherein when the unlock position is established, the first member becomes unsupported by the second member and swings around the first axis to retreat from the gap.

14. The retreat mechanism according to claim 13, wherein the lock mechanism displaces the second member to the unlock position on a basis of a contact with the shield wall.

15. The retreat mechanism according to claim 13, wherein warning of occurrence of a disaster triggers the second member to be displaced from the lock position to the unlock position.

16. The retreat mechanism according to claim 13, wherein the second member is displaced from the lock position to the unlock position after the transportation robot retreats from a surface of the retreat mechanism onto the floors.

17. The retreat mechanism according to claim 12, wherein the retreat mechanism is located between an adjacent pair of the floor panels opposed to each other with the gap in between.

18. The retreat mechanism according to claim 12, wherein a length from an inner edge to an outer edge of the first member is smaller than a dimension of the gap.

19. The retreat mechanism according to claim 12, wherein a length from an inner edge to an outer edge of the second member is smaller than a dimension of the gap.

20. The retreat mechanism according to claim 12, wherein the rack includes a plurality of support columns supporting the floors, the retreat mechanism is located between the pair of the support columns respectively in the first section and second section.

\* \* \* \* \*